US011866908B2

(12) United States Patent
Yamamoto et al.

(10) Patent No.: US 11,866,908 B2
(45) Date of Patent: Jan. 9, 2024

(54) WORKING MACHINE

(71) Applicant: KOBELCO CONSTRUCTION MACHINERY CO., LTD., Hiroshima (JP)

(72) Inventors: Keiji Yamamoto, Hiroshima (JP); Takuzo Shimoi, Hiroshima (JP); Shinnosuke Matsushima, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 124 days.

(21) Appl. No.: 17/448,721

(22) Filed: Sep. 24, 2021

(65) Prior Publication Data

US 2022/0098826 A1 Mar. 31, 2022

(30) Foreign Application Priority Data

Sep. 30, 2020 (JP) ................................. 2020-165108
Mar. 9, 2021 (JP) ................................. 2021-037209

(51) Int. Cl.
*E02F 9/16* (2006.01)
*B62D 33/06* (2006.01)
*B62D 27/02* (2006.01)

(52) U.S. Cl.
CPC ............ *E02F 9/163* (2013.01); *B62D 27/023* (2013.01); *B62D 33/0617* (2013.01)

(58) Field of Classification Search
CPC .............................. E02F 9/163; B62D 33/0617
USPC ....................................... 296/190.03, 190.08
See application file for complete search history.

(56) References Cited

U.S. PATENT DOCUMENTS

| 8,267,467 | B2* | 9/2012 | Takaoka ............... | B62D 27/023 296/190.08 |
| 9,994,264 | B2* | 6/2018 | Salvini ................... | B60J 10/34 |
| 11,001,987 | B2* | 5/2021 | Yamamitsu ............. | E02F 9/163 |
| 11,203,853 | B2* | 12/2021 | Lee ...................... | B62D 33/0604 |

(Continued)

FOREIGN PATENT DOCUMENTS

| EP | 1 752 585 A2 | 2/2007 |
| EP | 2 261 106 A2 | 12/2010 |

(Continued)

OTHER PUBLICATIONS

Extended European Search Report dated Feb. 16, 2022 in European Patent Application No. 21197602.2, 8 pages.

*Primary Examiner* — Dennis H Pedder
(74) *Attorney, Agent, or Firm* — Oblon, McClelland, Maier & Neustadt, L.L.P.

(57) ABSTRACT

A working machine includes a load transmitting member including: an upper pillar part; an intermediate part extending to circumvent a window from a position above a lower corner of a window edge of the window and outer than the lower corner in a wall width direction to a position below the lower corner and inner than the lower corner in the wall width direction; and a beam part extending so as to be farther away from a wall side edge under the window. The upper pillar part, the intermediate part, and the beam part are continuous in this order so that a load applied to an upper portion of a cabin is transmitted to an upper frame. At least the intermediate part of the load transmitting member is made of a single member.

9 Claims, 20 Drawing Sheets

(56) References Cited

U.S. PATENT DOCUMENTS

| | | | |
|---|---|---|---|
| 2002/0079721 A1* | 6/2002 | Colliar | B62D 33/0617 |
| | | | 296/190.08 |
| 2004/0104060 A1 | 6/2004 | Mori et al. | |
| 2007/0035160 A1* | 2/2007 | Murakami | E02F 9/163 |
| | | | 296/190.03 |
| 2009/0273206 A1* | 11/2009 | Namura | B62D 33/0617 |
| | | | 403/24 |
| 2010/0147603 A1* | 6/2010 | Davis | B62D 33/0617 |
| | | | 180/9.46 |
| 2010/0314908 A1 | 12/2010 | Wood, Jr. et al. | |
| 2012/0038186 A1* | 2/2012 | Takaoka | E02F 9/163 |
| | | | 296/190.03 |
| 2013/0221703 A1* | 8/2013 | Kim | B62D 33/0617 |
| | | | 296/190.03 |
| 2014/0217779 A1 | 8/2014 | Gielda et al. | |
| 2019/0382981 A1* | 12/2019 | Lee | E02F 9/163 |

FOREIGN PATENT DOCUMENTS

| | | |
|---|---|---|
| EP | 2 423 392 A1 | 2/2012 |
| JP | 2004-042739 A | 2/2004 |
| JP | 2007-046396 A | 2/2007 |
| JP | 2010-255215 A | 11/2010 |
| JP | 2010-270557 A | 12/2010 |
| JP | 2020-169454 A | 10/2020 |

\* cited by examiner

WORKING MACHINE

TECHNICAL FIELD

The present disclosure relates to a working machine.

BACKGROUND ART

A hydraulic excavator serving as an exemplary working machine includes: a lower traveling body; an upper frame slewably supported on the lower traveling body; a working device including a boom tiltably supported on the upper frame; and a cabin having a box shape defining an inner space therein, and supported by the upper frame on a lateral side of the boom. The cabin includes a plurality of walls enclosing the inner space from front, rear, left, and right thereof. The walls include, for example, a rear wall forming a back surface of the cabin, a left wall forming a left surface of the cabin, and a right wall forming a right surface of the cabin. The rear wall has a window edge defining a rear window, and each of the left wall and the right wall has a window edge defining a side window in some cases. The rear window and the side windows are provided to ensure a visibility of an operator through the windows.

For example, a large load is applied to an upper portion of the cabin when the working machine is rolled or turned over. Therefore, the cabin of the working machine is required to have such a stiffness that the working machine can maintain the inner space of the cabin even when the working machine is rolled or turned over from the perspective of ensuring the safety of the operator.

Unexamined Japanese Patent Publication No. 2007-46396 discloses a working machine including a load-transmitting beam for transmitting a lateral load, which is applied to a left rear pillar from the left thereof, to a right rear pillar to enhance a deformation-suppressing effect in a left-right direction of the cabin. Unexamined Japanese Patent Publication No. 2004-42739 discloses a working machine including a transverse member connecting a left support and a right support with each other in a rear portion thereof at an intermediate position of each of the supports in an up-down direction.

However, a crack is likely to occur in a portion around a lower corner of a window edge of a wall of the cabin when a large load is applied to an upper portion of the cabin in the working machine in each of Unexamined Japanese Patent Publication No. 2007-46396 and Unexamined Japanese Patent Publication No. 2004-42739. More details will be described below. The rear window is defined by a window edge having a left lengthwise section, lower section, and a lower corner connecting these sections with each other. When the working machine is rolled over and the lateral load is applied from, for example, the left to the upper portion of the cabin, a crack is likely to occur in the portion around the lower corner (corner adjacent portion). The crack occurrence in the corner adjacent portion would decrease the stiffness of the cabin. Moreover, each of Unexamined Japanese Patent Publication No. 2010-270557, Unexamined Japanese Patent Publication No. 2010-255215, and Unexamined Japanese Patent Publication No. 2020-169454 merely discloses a structure of a cab in a working machine without any consideration of suppressing such a crack occurrence in a portion around the lower corner of the window edge.

SUMMARY OF INVENTION

This disclosure has been made in view of the aforementioned drawbacks, and an object thereof is to provide a working machine for achieving an ensured visibility through a window and suppression of a decrease in the stiffness of a cabin by suppressing a crack occurrence in a corner adjacent portion around a lower corner of a window edge defining the window even when a load is applied to an upper portion of the cabin.

The provided working machine includes: an upper frame supported on a lower traveling body; and a cabin having a box shape defining an inner space therein, and supported by the upper frame. The cabin includes: a plurality of walls enclosing the inner space respectively from front, rear, left, and right thereof; and a load transmitting member disposed along a specific wall which is one of the walls. The specific wall has: a wall side edge serving as a side edge located at an end thereof in a wall width direction which is a width direction of the specific wall and extending in a lengthwise direction; and a window edge defining a window located at an inner position than the wall side edge in the wall width direction. The window edge has: a lengthwise section extending in a direction along the wall side edge; a lower section extending in a direction intersecting the direction in which the lengthwise section extends; and a lower corner connecting the lengthwise section and the lower section with each other. The load transmitting member includes: an upper pillar part extending downward from an upper portion of the specific wall along the lengthwise section of the window edge at an outer position than the lengthwise section in the wall width direction; an intermediate part extending to circumvent the window from a position above the lower corner and outer than the lower corner in the wall width direction to a position below the lower corner and inner than the lower corner in the wall width direction: and a beam part extending from the intermediate part so as to be farther away from the wall side edge under the window. The upper pillar part, the intermediate part, and the beam part are continuous in this order so that a load applied to an upper portion of the cabin in a direction along the specific wall is transmitted to the upper frame, and at least the intermediate part of the load transmitting member is made of a single member.

DESCRIPTION OF EMBODIMENTS

Hereinafter, a working machine according to each of embodiments of this disclosure will be described with reference to the accompanying drawings.

First Embodiment

Figure 1:
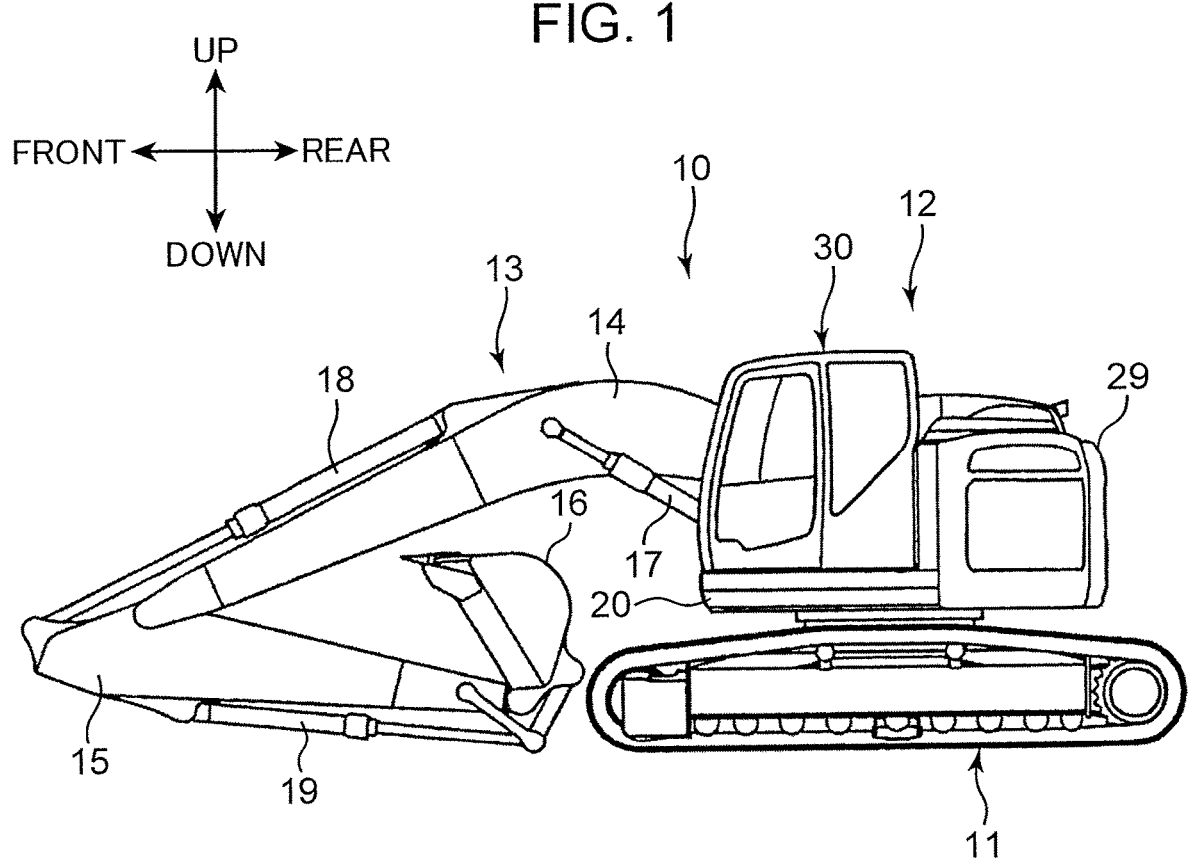
FIG. 1 is a side view of a working machine according to a first embodiment of this disclosure.

FIG. 1 is a side view of a hydraulic excavator 10 according a first embodiment of this disclosure. The hydraulic excavator 10 serves as an exemplary working machine. As shown in FIG. 1, the hydraulic excavator 10 includes a lower traveling body 11, an upper slewing body 12 slewably supported on the lower traveling body 11, a working device 13, and a plurality of hydraulic actuators.

The upper slewing body 12 includes an upper frame 20 slewably supported on the lower traveling body 11, a cabin 30 supported on the upper frame 20, and a counterweight 29 arranged at the back of the cabin 30.

The working device 13 includes a boom 14 tiltably supported on the upper frame 20, an arm 15 rotatably supported on a distal end of the boom 14, and a bucket 16 rotatably supported on a distal end of the arm 15.

The hydraulic actuators include: a boom cylinder 17 which operates to tiltably move the boom 14 in response to a supply of a hydraulic oil from an unillustrated hydraulic pump; an arm cylinder 18 which operates to rotatably move the arm 15 in response to a supply of the hydraulic oil from the hydraulic pump; a bucket cylinder 19 which operates to rotatably move the bucket 16 in response to a supply of the hydraulic oil from the hydraulic pump; and an unillustrated slewing motor which drives to slewably move the upper frame 20 in response to a supply of the hydraulic oil from the hydraulic pump.

Figure 2:
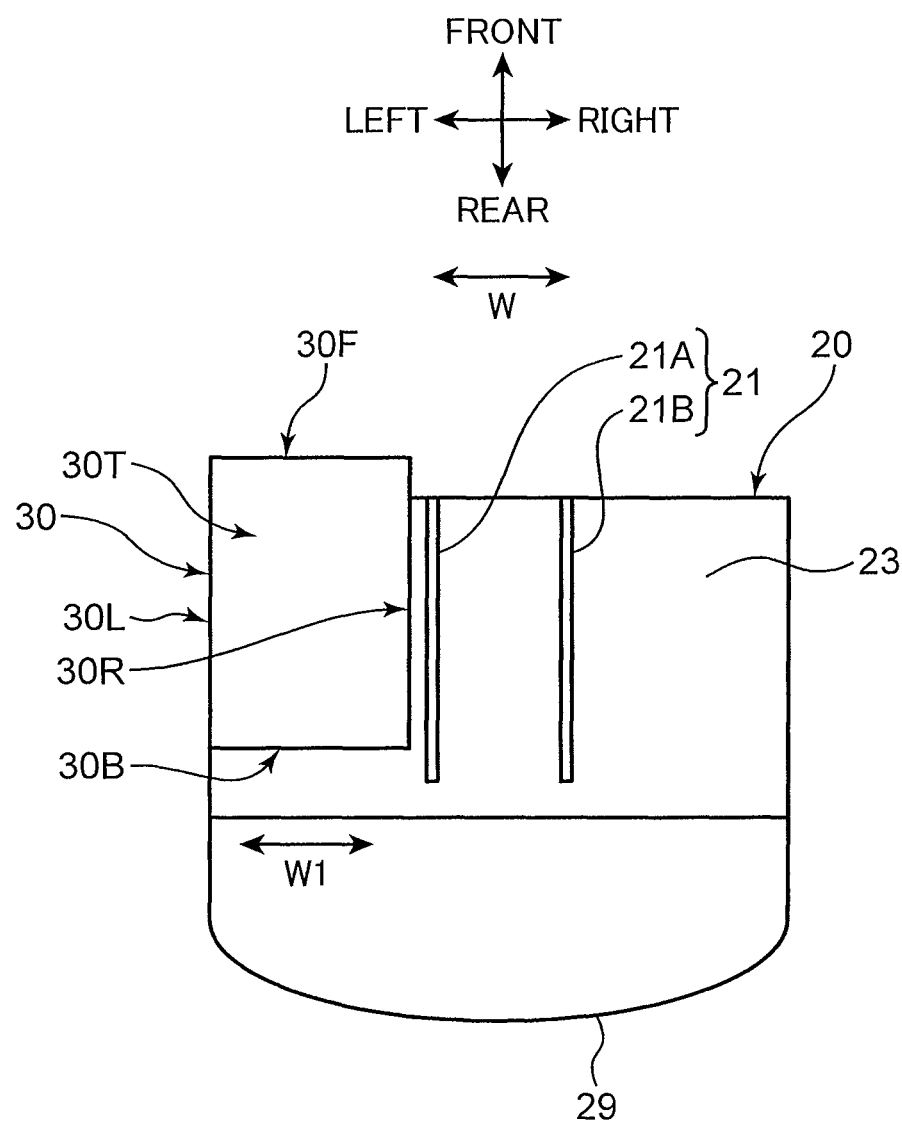
FIG. 2 is a plan view of an upper frame and a cabin of the working machine.
Figure 3:
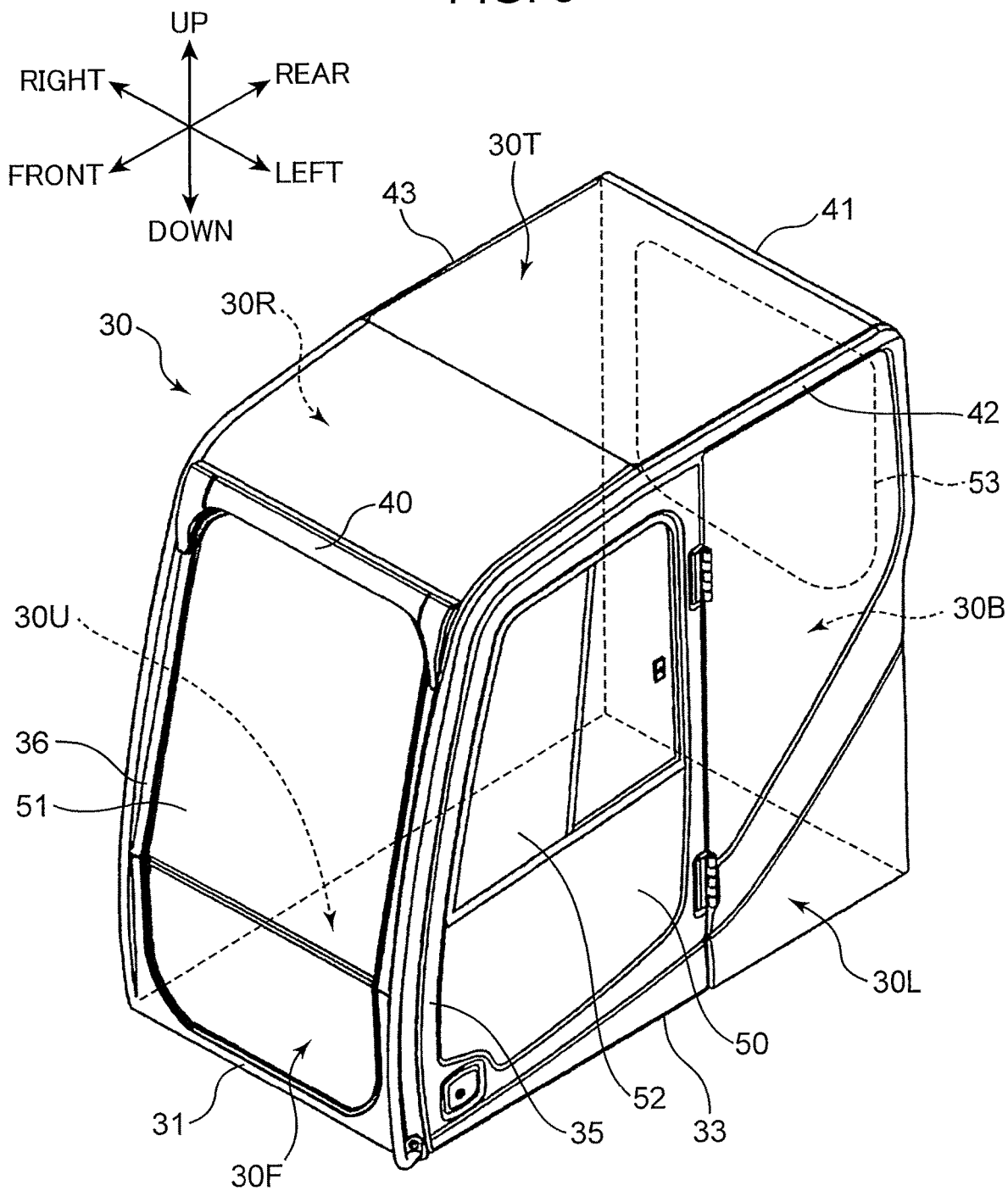
FIG. 3 is a perspective view of the cabin.
Figure 4:
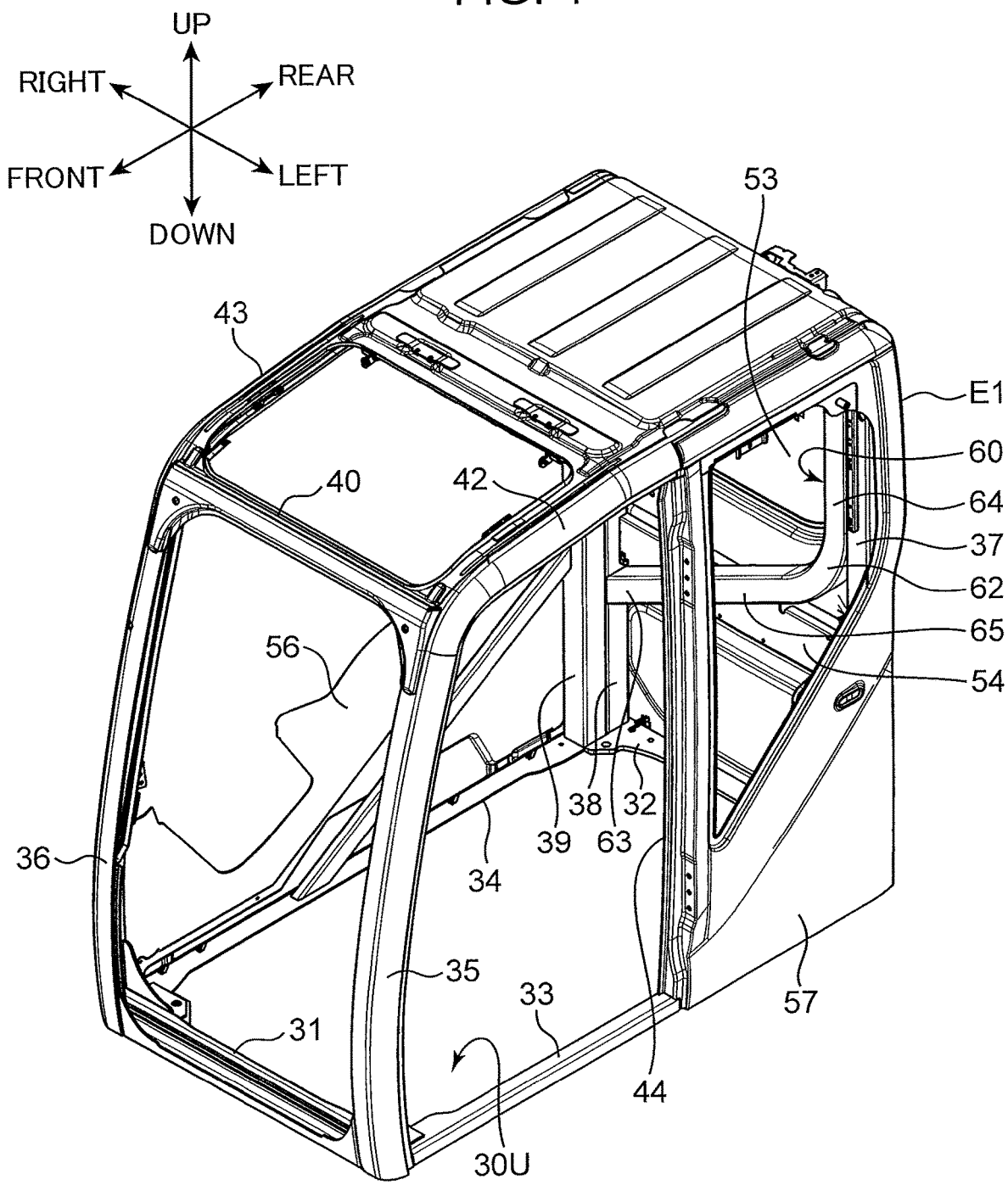
FIG. 4 shows a structure of the cabin excluding a part of components constituting the cabin for explanation.
Figure 5:
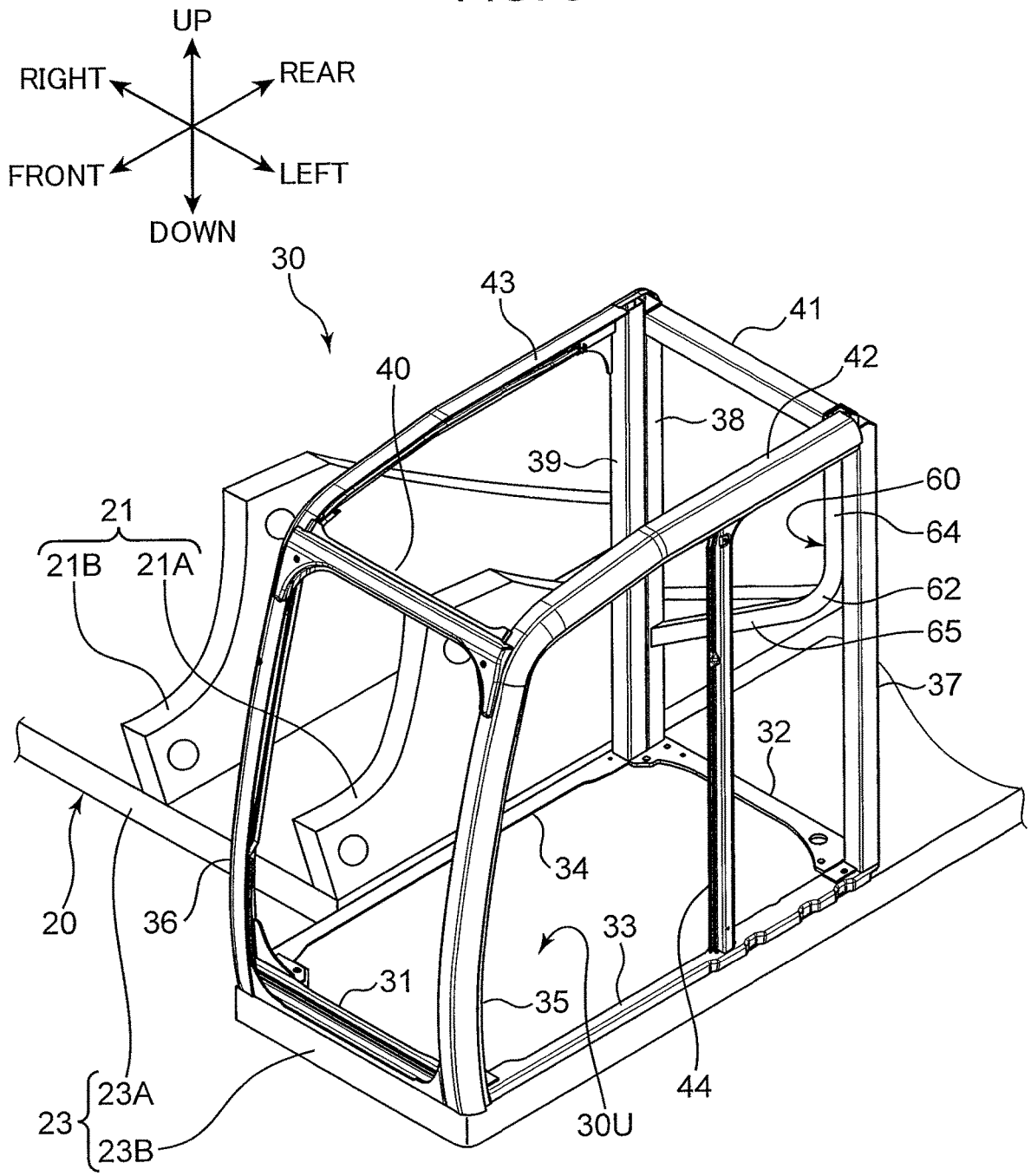
FIG. 5 is a perspective view of the cabin including a plurality of pillars, a plurality of beams, a plurality of lower frames and a load transmitting member, and a frame main body and a frame forming member included in the upper frame.

FIG. 2 is a plan view showing the upper frame 20 and the cabin 30 of the hydraulic excavator 10. FIG. 3 is a perspective view of the cabin 30. FIG. 4 shows a structure of the cabin 30 excluding a part of the components constituting the cabin 30 for explanation. FIG. 5 is a perspective view showing a framework of the cabin 30.

As shown in FIGS. 2 and 5, the upper frame 20 includes a frame main body 23 having an upper surface on which the cabin 30 is mounted, and a boom supporting part 21 arranged on the upper surface of the frame main body 23. The frame main body 23 has a center section 23A and a side deck 23B. The side deck 23B is arranged to the left of the center section 23A and supported by the center section 23A. Although unillustrated, another side deck is arranged to the right of the center section 23A as well. The boom supporting part 21 tiltably supports the boom 14 with a proximal end of the boom 14 being attached thereto. The boom supporting part 21 includes a pair of left and right protrusions 21A, 21B. The protrusions 21A, 21B are spaced away from each other in the left-right direction, and each of the protrusions is a plate-shaped member extending in the front-rear direction and stands upward from an upper surface of the center section 23A of the frame main body 23. The boom supporting part 21 is located around a center of the frame main body 23 in a width direction W of the upper frame 20 (width direction W of the frame main body 23) shown in FIG. 2. The width direction W of the upper frame 20 corresponds to the left-right direction. The left protrusion 21A of the boom supporting part 21 is adjacent to the cabin 30 at an inner position in the width direction W (right position in the embodiment) than the cabin 30.

As shown in FIG. 2, the cabin 30 is supported by the frame main body 23 of the upper frame 20 at a position deviating from the center of the upper frame in the width direction W to an outer side (left side in the embodiment) thereof in the width direction W. Specifically, the cabin 30 is arranged on the side deck 23B of the frame main body 23. The cabin 30 has a box shape defining an inner space therein. The inner space of the cabin 30 accommodates an unillustrated operator seat, a manipulation lever, a manipulation pedal, and other components.

As shown in FIG. 3, the cabin 30 includes: a front wall 30F (front surface part 30F) located in front of the inner space and having a front window 51; a rear wall 30B (back surface part 30B) located at the back of the inner space and having a rear window 53; a left wall 30L (left surface part 30L) located to the left of the inner space and having a door 50; a right wall 30R (right surface part 30R) located to the right of the inner space and having a right window; an upper wall 30T (top surface part 30T) located above the inner space; and a lower wall 30U (bottom surface part 30U) located under the inner space and having a bottom surface of the cabin 30. The door 50 has a left window 52. The cabin 30 includes a plurality of pillars, a plurality of beams, a plurality of lower frames, and a load transmitting member 60. The rear wall 30B serves as an exemplary specific wall. The front wall 30F, the rear wall 30B, the left wall 30L, and the right wall 30R serve as exemplary walls enclosing the inner space respectively from front, rear, left, and right thereof.

As shown in FIG. 5, the pillars include a left front pillar 35, a right front pillar 36, a left rear pillar 37, a first right rear pillar 38, a second right rear pillar 39, and a left intermediate pillar 44. The lower frames include a front lower frame 31, a rear lower frame 32, a left lower frame 33, and a right lower frame 34. The beams include a front upper beam 40, a rear upper beam 41, a left upper beam 42, and a right upper beam 43. Each of the front lower frame 31, the rear lower frame 32, the front upper beam 40, and the rear upper beam 41 is a structural member extending in the left-right direction (width direction W). Each of the left lower frame 33, the right lower frame 34, the left upper beam 42, and the right upper beam 43 is a structural member extending in the front-rear direction. Each of the pillars is a structural member extending in the up-down direction or in a direction inclined to the up-down direction.

Figure 6:
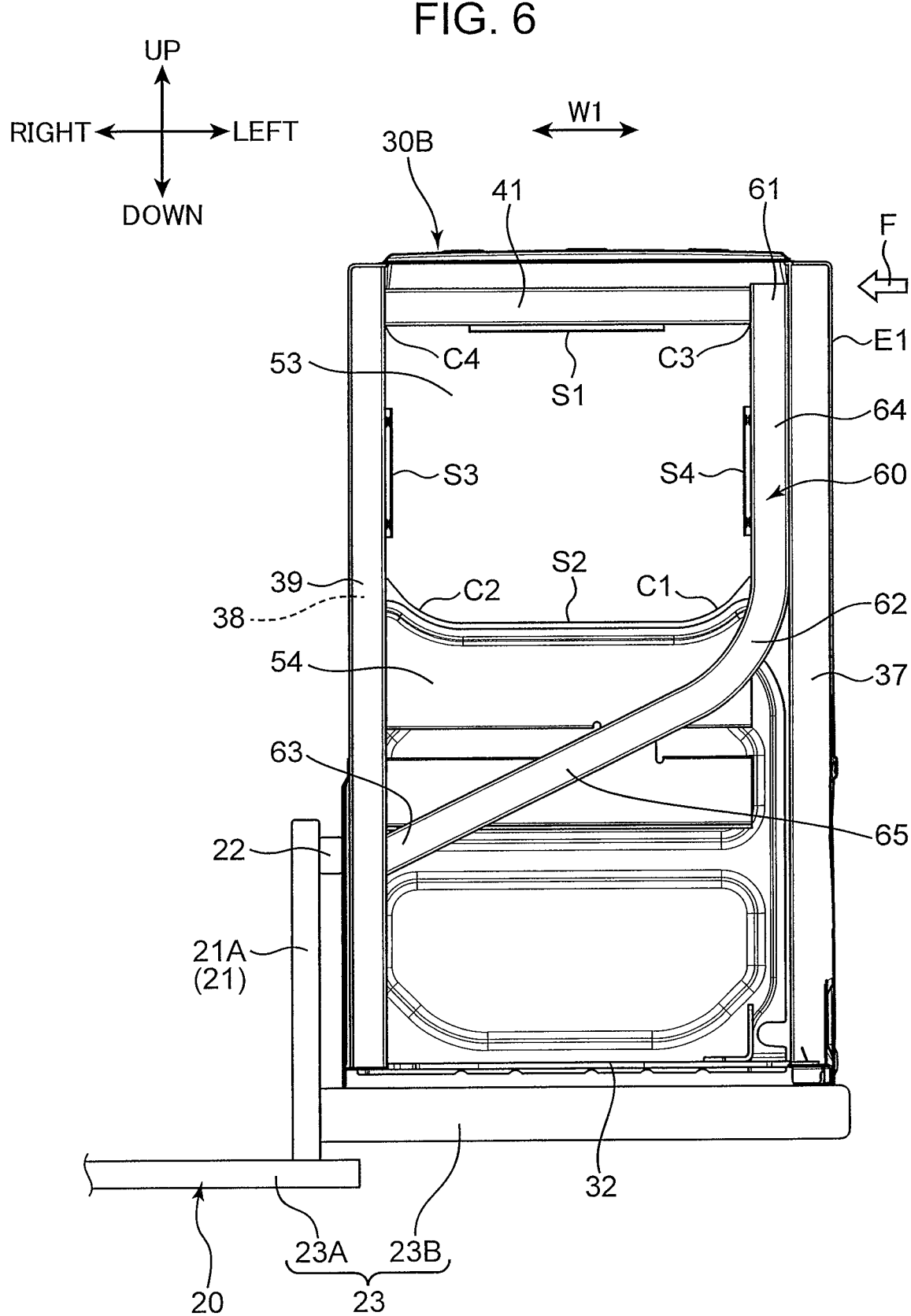
FIG. 6 is a front view showing a rear wall (back surface part) and the load transmitting member of the cabin.

The rear wall 30B stands upward from the side deck 23B of the frame main body 23 in the upper frame 20, and forms a back surface of the cabin 30. As shown in FIG. 6, the rear wall 30B has a rectangular shape in a front view. The rear wall 30B includes a rear panel 54. The rear panel 54 has a left end connected to the left rear pillar 37, a right end connected to the first right rear pillar 38, a lower end connected to the rear lower frame 32, and an upper end connected to the rear upper beam 41.

As shown in FIGS. 4 and 6, the rear panel 54 of the rear wall 30B has a wall side edge E1 serving as a left side edge located at a left end of the rear wall 30B in a wall width direction W1 (see FIGS. 2 and 6) which is a width direction of the rear wall 30B and extending in a lengthwise direction. The wall width direction W1 in the first embodiment corresponds to the left-right direction. The lengthwise direction in which the wall side edge E1 extends may correspond to the up-down direction or a direction inclined to the up-down direction. The wall side edge E1 may extend from an upper end to a lower end of the rear wall 30B while changing its extension direction as shown in FIG. 4, and the concept of the lengthwise direction covers this aspect.

The left rear pillar 37 serves as an exemplary rear pillar in this disclosure. The left rear pillar 37 extends from the upper end of the rear wall 30B to the lower end of the rear wall 30B along the wall side edge E1. The left rear pillar 37 extends downward from a rear end of the left upper beam 42 to a rear end of the left lower frame 33. The first right rear pillar 38 extends from the upper end of the rear wall 30B to the lower end of the rear wall 30B along a right edge of the rear panel 54, the right edge being located at a right end of the rear panel 54 in the wall width direction W1. The first right rear pillar 38 extends downward from a rear end of the right upper beam 43 to a rear end of the right lower frame 34. The rear upper beam 41 extends in the wall width direction W1 to connect an upper end of the left rear pillar 37 and an upper end of the first right rear pillar 38 with each other. The rear lower frame 32 extends in the wall width direction W1 to connect a lower end of the left rear pillar 37 and a lower end of the first right rear pillar 38 with each other. The second right rear pillar 39 is adjacent to the first right rear pillar 38 in front of the first right rear pillar 38 and extends downward from the rear end of the right upper beam 43 to the rear end of the right lower frame 34.

The rear panel 54 has an opening in an upper portion thereof as shown in FIGS. 4 and 6. The opening of the rear panel 54 serves as a rear window 53. The rear panel 54 has a window edge defining the rear window 53 (opening). A window glass is fit to the window edge.

The window edge of the rear panel 54 has an upper section S1, a lower section S2, an inner section S3 (right section S3), and an outer section S4 (left section S4). The outer section S4 serves as an exemplary lengthwise section. The outer section S4 extends in a direction along the wall side edge E1 of the rear wall 30B, and the lower section S2 extends in a direction intersecting the direction in which the outer section S4 extends. Specifically, the upper section S1 and the lower section S2 extend in the wall width direction W1 of the rear wall 30B (width direction W of the upper frame 20) at a distance therebetween in the up-down direction. The inner section S3 extends in the up-down direction at an inner position in the width direction W (right position in the embodiment) than the upper section S1 and the lower section S2. The outer section S4 extends in the up-down direction at an outer position in the width direction W (left position in the embodiment) than the upper section S1 and the lower section S2. The window edge further has an outer lower corner C1 connecting the outer section S4 and the lower section S2 with each other, an inner lower corner C2 connecting the inner section S3 and the lower section S2 with each other, an outer upper corner C3 connecting the outer section S4 and the upper section S1 with each other, and an inner upper corner C4 connecting the inner section S3 and the upper section S1 with each other. The outer lower corner C1 serves as an exemplary lower corner.

In the embodiment, the outer lower corner C1 has a shape extending downward and rightward (inward in the width direction W) from a lower end of the outer section S4. In contrast, the outer section S4 has a shape extending in the up-down direction, and the lower section S2 has a shape extending in the left-right direction (width direction W). Specifically, the outer lower corner C1 has a curving shape smoothly connecting the lower end of the outer section S4 and a left end of the lower section S2 with each other. The inner lower corner C2 has a shape extending downward and leftward (outward in the width direction W) from a lower end of the inner section S3. Here, each of the outer lower corner C1 and the inner lower corner C2 may have a shape such as, for example, a substantially square corner. In the embodiment, each of the upper section S1, the lower section S2, the inner section S3, and the outer section S4 may linearly extend, and at least one of the upper section S1, the lower section S2, the inner section S3, and the outer section S4 may have a curving portion.

The load transmitting member 60 is fixedly attached to at least one of the rear panel 54 of the rear wall 30B, the left rear pillar 37, and the first right rear pillar 38. The load transmitting member 60 includes an upper pillar part 64, an intermediate part 62, and a beam part 65. The upper pillar part 64 extends downward from an upper portion of the rear wall 30B along the outer section S4 at an outer position in the wall width direction W1 than the outer section S4, i.e., to the left of the outer section S4. The intermediate part 62 extends to circumvent the rear window 53 from an outer-upper position to an inner-lower position. The outer-upper position is located above the outer lower corner C1 and outer in the wall width direction W1 than the lower corner C1, i.e., to the left of the lower corner C1 (outer position in the wall width direction W). The inner-lower position is located below the outer lower corner C1 and inner in the wall width direction W1 than the outer lower corner C1, i.e., to the right of the outer lower corner C1 (inner position in the width direction W). The beam part 65 extends from the intermediate part 62 so as to be farther away from the wall side edge E1. Specifically, the beam part 65 extends rightward (inward in the width direction W) under the rear window 53 from an inner end that is a right end of the intermediate part 62 (inner end in the width direction W) toward a frame forming member which forms a part of the upper frame 20.

In the embodiment, an entirety of the load transmitting member 60 is made of a single member. In other words, the load transmitting member 60 is not formed of a plurality of members sequentially welded to each other. Therefore, the load transmitting member 60 has no welded part in the intermediate part 62 located in the corner adjacent portion around the outer lower corner C1. The welded part here does not mean a part for fixing the load transmitting member 60 to, for example, the rear wall 30B, but means a part for forming the load transmitting member 60. The load transmitting member 60 may be prepared by a molding way, e.g., an extrusion molding, but the molding way is not limited to the extrusion molding. The load transmitting member 60 has a closed cross-section in a quadrangular shape for example, but the closed cross-section may have other shape, such as a circular shape and an oval shape. It should be noted here that left and right load transmitting members 70R, 70L in a second embodiment to be described later have these features as well.

The upper pillar part 64, the intermediate part 62, and the beam part 65 are continuous in this order so that a lateral load F applied, from the left (outside in the width direction W), to the upper portion of the cabin 30 is transmitted to the frame forming member. In the embodiment, the frame forming member includes the left protrusion 21A of the boom supporting part 21 and a coupling member 22 attached to the left protrusion 21A. The left protrusion 21A and the coupling member 22 form a part of the upper frame 20.

The upper pillar part 64 has an upper end 61, i.e., the load transmitting member 60 has the upper end 61, the upper end 61 being connected to the rear upper beam 41. The upper end 61 of the load transmitting member 60 is at a specific height position in the upper portion of the cabin 30 to which the lateral load F is applied from the left thereof when the hydraulic excavator 10 is rolled over, or is near the specific height position. The upper pillar part 64 is located at an inner position in the wall width direction W1 than the left rear pillar 37, i.e., to the right of the left rear pillar 37 (inner position in the width direction W). The upper pillar part 64 extends downward along an upper portion of the left rear pillar 37 in adjacent to the left rear pillar 37. The upper pillar part 64 is arranged between the left rear pillar 37 and the outer section S4 of the window edge in a front view. The upper end 61 of the load transmitting member 60 is above the outer upper corner C3 in the embodiment, but may be below the outer upper corner C3. The upper end 61 of the load transmitting member 60 is located at an outer position in the wall width direction W1 than the outer upper corner C3, i.e., to the left of the outer upper corner C3 (outer position in the width direction W).

In the embodiment, the intermediate part 62 has a portion curving farther away from the wall side edge E1 while advancing diagonally downward. The intermediate part 62 has a portion extending at an outer position than the outer lower corner C1 while curving so as to circumvent the outer lower corner C1 having a curving shape in the front view. The intermediate part 62 has a portion curving so as to cover the outer side of the outer lower corner C1 in the front view.

The beam part 65 has a shape linearly extending farther away from the wall side edge E1 and diagonally downward toward the left protrusion 21A of the boom supporting part 21. In other words, the beam part 65 has a shape linearly extending rightward (inward in the width direction W) from the inner end of the intermediate part 62 and diagonally downward toward the frame forming member. The beam part 65 having a linear shape extending diagonally downward to the right can prevent a curvature radius in the curving portion of the intermediate part 62 from decreasing to thereby allow the intermediate part 62 to have a gently curving shape.

The beam part 65 has a right end 63 (an inner end on the inner side in the width direction W), i.e., the load transmitting member 60 has the right end 63 (serving as a lower end 63 of the load transmitting member 60 as well), the right end 63 being connected to the first right rear pillar 38. The right end 63 of the load transmitting member 60 and the left protrusion 21A of the upper frame 20 are located so as to be continuous each other via the first right rear pillar 38 and the coupling member 22. In this way, the load transmitting member 60 can transmit the lateral load F, which is applied from the left to the upper portion of the cabin 30, to the left protrusion 21A. Here, the right rear pillar 38 and the left protrusion 21A may be directly coupled to each other by excluding the coupling member 22.

The upper pillar part 64 extends downward along the outer section S4 of the window edge, the intermediate part 62 extends to circumvent the rear window 53, and the beam part 65 extends under the rear window 53 in the hydraulic excavator 10 according to the embodiment. In this configuration, the load transmitting member 60 can transmit the lateral load F to the frame forming member while ensuring the visibility and an evacuation route through the rear window 53 without overlapping the rear window 53. Moreover, the intermediate part 62 of the load transmitting member 60 made of a single member can suppress a decrease in the stiffness of the cabin 30 by suppressing a crack occurrence in the intermediate part 62 even when the lateral load F is applied to the upper portion of the cabin 30.

Specifically, the load transmitting member 60 has no welded part around the corner adjacent portion. The load transmitting member 60 thus can transmit the lateral load F to the frame forming member of the upper frame 20 via the upper pillar part 64, the intermediate part 62, and the beam part 65 while suppressing a decrease in the stiffness of the cabin 30 by suppressing a crack occurrence in the intermediate part 62 located in the corner adjacent portion when the lateral load F is applied to the upper portion of the cabin. The upper frame 20 has a great strength, and hence the left protrusion 21A forming a part of the upper frame 20 can receive the lateral load F transmitted via the load transmitting member 60.

Accordingly, the load transmitting member 60 is supported by the left protrusion 21A when the lateral load F is applied to the upper portion of the cabin 30, and accordingly the intermediate part 62 of the load transmitting member 60 located in the corner adjacent portion can avoid the crack occurrence. Furthermore, the load transmitting member 60 does not overlap the rear window 53. The hydraulic excavator 10 can consequently suppress a decrease in the stiffness of the cabin by suppressing a crack occurrence in the corner adjacent portion while ensuring the visibility and the evacuation route through the rear window 53.

In contrast, the working machine in each of Unexamined Japanese Patent Publication No. 2007-46396 and Unexamined Japanese Patent Publication No. 2004-42739 has a structure in which a substantially horizontally extending beam (transverse member) has a left end connected to a central portion of the left pillar (left support) extending in the up-down direction. Therefore, a welded part for connecting the left end and the left pillar with each other exists near the corner adjacent portion around the left lower corner of the window edge. In this respect, when the lateral load is applied to the upper portion of the cabin and the window edge is deformed in such a manner that the lengthwise section and the lower section of the window edge approach each other around the left lower corner, a crack is likely to occur at the welded part located in the corner adjacent portion.

In the embodiment, the entirety of the load transmitting member 60 including the intermediate part 62 is not formed of a plurality of members sequentially welded to each other, but is made of a single member. As a result, a crack occurrence attributed to the welded part is suppressible over the entirety of the load transmitting member 60.

In the embodiment, the intermediate part 62 has the portion curving inward in the wall width direction W1, i.e., rightward (inward in the width direction W) while advancing diagonally downward from the lower end of the upper pillar part 64. Thus, a spring effect is attainable in the intermediate part 62. The spring effect enables the load transmitting member 60 to effectively absorb a part of energy of the lateral load F when the lateral load F is applied to the upper portion of the cabin 30. This can consequently further suppress a crack occurrence in the intermediate part 62 located in the corner adjacent portion.

In the embodiment, the beam part 65 has a shape linearly extending, toward the frame forming member, rightward (inward in the width direction W) from the inner end of the intermediate part 62 while advancing downward. Therefore, the lateral load F is efficiently and linearly transmittable to the frame forming member via the beam part 65 linearly extending from the inner end of the intermediate part 62 and diagonally downward toward the frame forming member even in a configuration where the frame forming member is located below the inner end of the intermediate part 62.

In the embodiment, the upper pillar part 64 of the load transmitting member 60 is located at the inner position in the wall width direction W1 than the left rear pillar 37 (outer pillar), i.e., to the right of the left rear pillar 37 (inner position in the width direction W). The upper pillar part 64 extends downward along the left rear pillar 37 in adjacent to the left rear pillar 37. The load transmitting member 60 serving as another member independent of the left rear pillar 37 in this manner can further increase the stiffness of the cabin 30 against the lateral load F. Furthermore, the lateral load F applied to the upper portion of the cabin 30 is efficiently transmitted to the upper pillar part 64 of the load transmitting member 60 extending downward along the left rear pillar 37 in adjacent to the left rear pillar 37 via the left rear pillar 37.

Modifications of the First Embodiment

Heretofore, the working machine according to the first embodiment of the present disclosure is described, but the present disclosure is not limited to this embodiment and include, for example, the following modifications.

Figure 7:
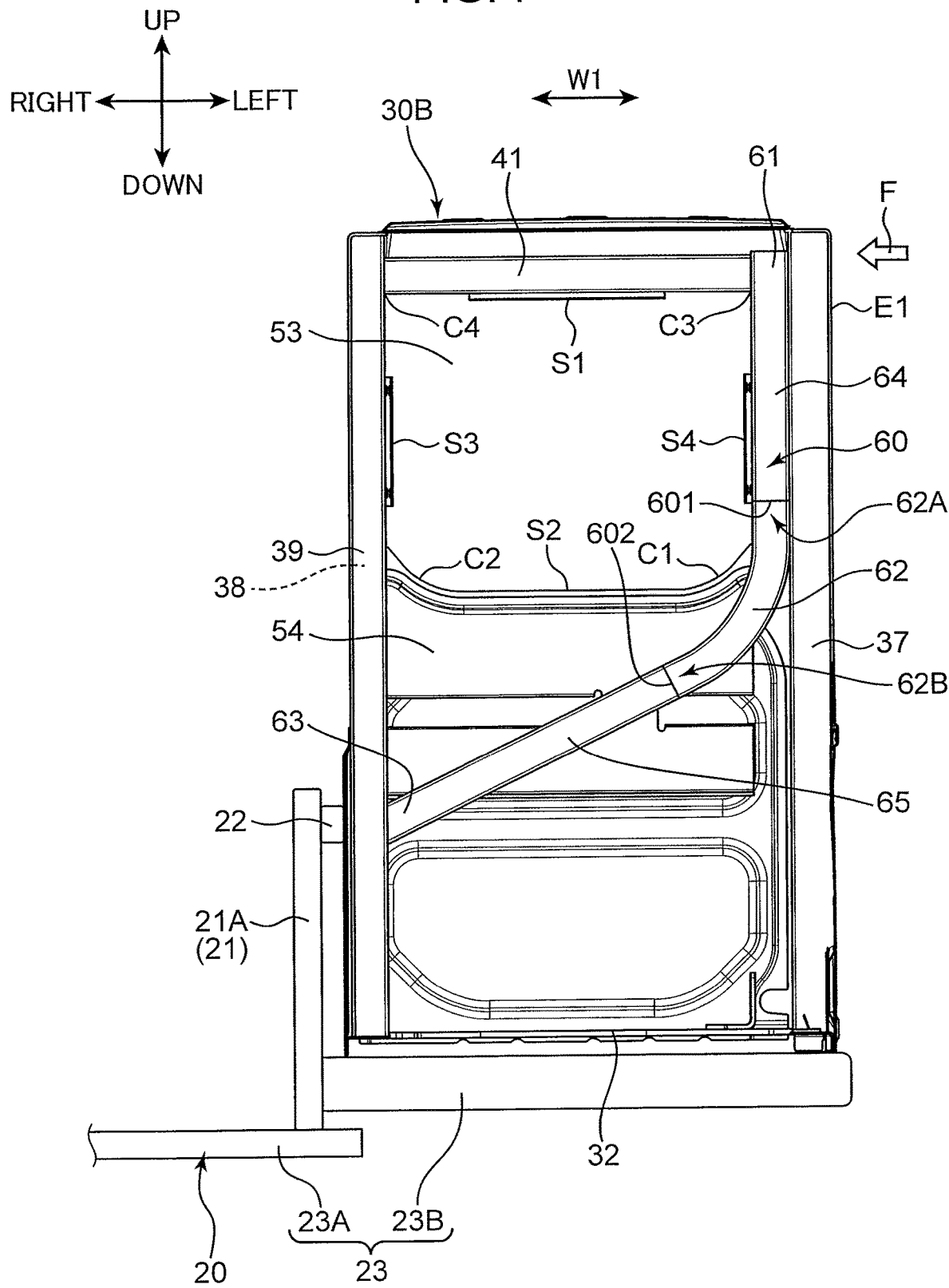
FIG. 7 is a front view showing a rear wall and a load transmitting member of a cabin in a working machine according to a first modification of the first embodiment.

FIG. 7 is a front view showing a rear wall 30B of a cabin 30 and a load transmitting member 60 in a hydraulic excavator 10 according to a first modification of the first embodiment. As shown in FIG. 7, the load transmitting member 60 in the first modification is formed of an upper pillar part 64, an intermediate part 62, and a beam part 65 joined to one another by using a joining way, such as welding. Specifically, a lower end of the upper pillar part 64 and an upper end 62A of the intermediate part 62 are joined to each other at a joint 601, and a right end 62B of the intermediate part 62 and a left end of the beam part 65 are joined to each other at a joint 602. The joining way is not limited to the welding, and may be another way, such as bolt fastening. The intermediate part 62 is made of a single member. The intermediate part 62 extends to circumvent a rear window 53 from an outer-upper position to an inner-lower position. The outer-upper position is located above an outer lower corner C1 and outer in a wall width direction W1 than the outer lower corner C1, i.e., to the left of the outer lower corner C1 (outer position in a wall width direction W).

The inner-lower position is located below the outer lower corner C1 and inner in the wall width direction W1 than the outer lower corner C1, i.e., to the right of the outer lower corner C1 (inner position in the width direction W). As shown in FIG. 7, the upper end 62A of the intermediate part 62 extends in a direction (up-down direction in the first modification) in which the upper pillar part 64 extends. The right end 62B of the intermediate part 62 extends in a direction (diagonally downward to the right in the first modification 1) in which the beam part 65 extends. Specifically, the intermediate part 62 has: an upper straight portion including the upper end 62A and extending in a direction in which the upper pillar part 64 extends; a lower straight portion including the right end 62B and extending in a direction in which the beam part 65 extends; and a curving portion which connects the upper straight portion and the lower straight portion with each other. Meanwhile, like the intermediate part 62 shown in FIG. 7, each of the intermediate part 62 shown in FIG. 6 and the intermediate parts 62 shown in FIGS. 8 to 16 may have: an upper straight portion extending in a direction in which the upper pillar part 64 extends; a lower straight portion extending in a direction in which the beam part 65 extends; and a curving portion connecting the upper straight portion and the lower straight portion with each other. Each of the intermediate part 74R and the intermediate parts 74L shown in FIGS. 17 to 20 may have: an upper straight portion extending in a direction in which the upper pillar part extends; a lower straight portion extending in a direction in which the beam part extends; and a curving portion connecting the upper straight portion and the lower straight portion with each other.

The remaining structures of the hydraulic excavator 10 according to the first modification are equivalent to those of the hydraulic excavator 10 according to the first embodiment described with reference to FIGS. 1 to 6.

Figure 8:
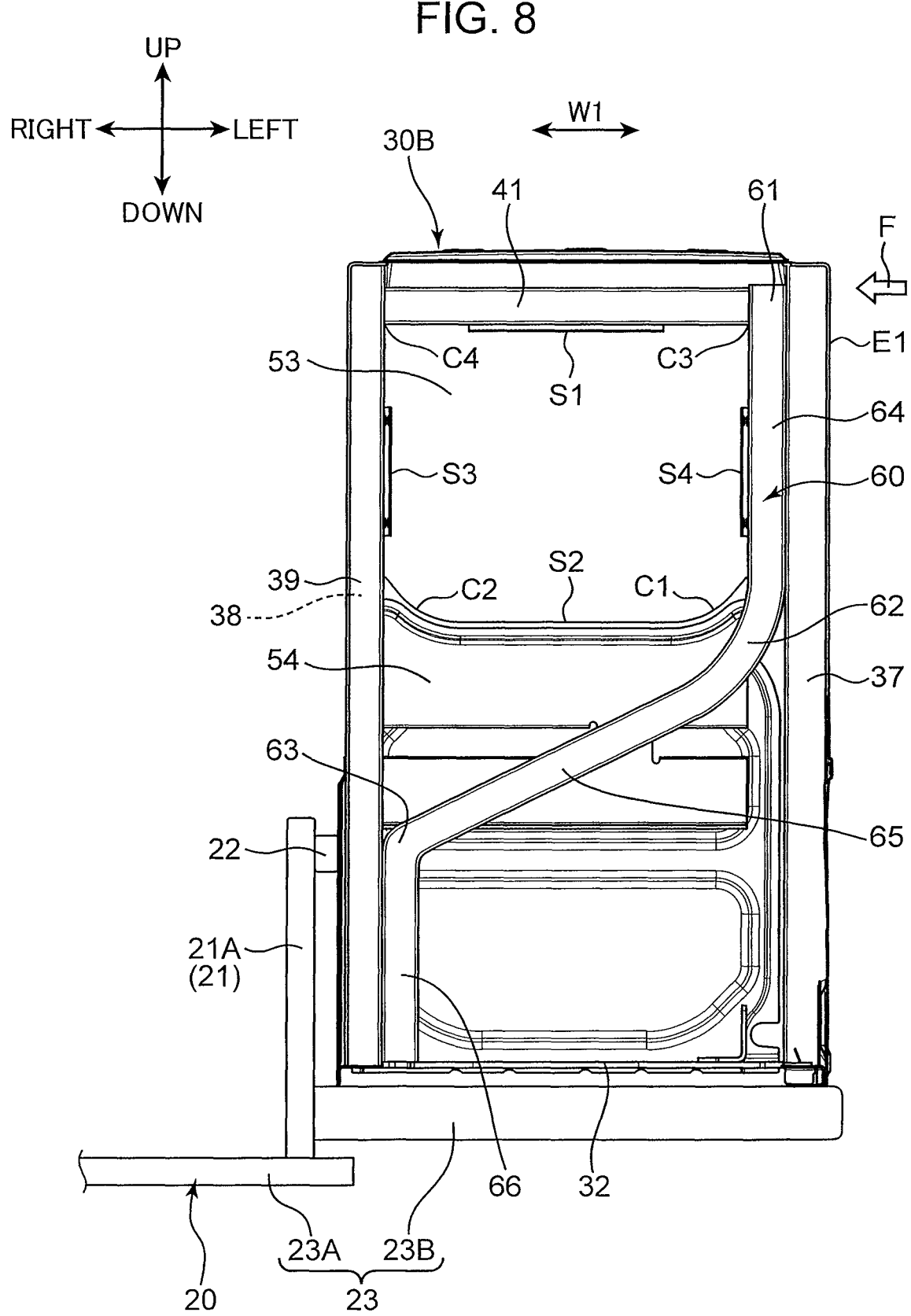
FIG. 8 is a front view showing a rear wall and a load transmitting member of a cabin in a working machine according to a second modification of the first embodiment.

FIG. 8 is a front view showing a rear wall 30B and a load transmitting member 60 of a cabin 30 in a hydraulic excavator 10 according to a second modification of the first embodiment. As shown in FIG. 8, the load transmitting member 60 may further include a lower pillar part 66 extending downward from a right end 63 (inner end on an inner side in a width direction W) of the beam part 65. In the second modification, the load transmitting member 60 further including the lower pillar part 66 can have a further increased stiffness, resulting in achieving a remarkably increased stiffness of the cabin 30. The lower pillar part 66 extends from the inner end of the beam part 65 to a lower end of the rear wall 30B. However, the lower pillar part 66 may not necessarily extend to the lower end of the rear wall 30B, and may have such a shape as to extend to a height position between the inner end of the beam part 65 and the lower end of the rear wall 30B. Furthermore, the lower pillar part 66 preferably has a lower end in contact with a rear lower frame 32 of the rear wall 30B or with a lower wall 30U. In this manner, the load transmitting member 60 can transmit a lateral load F to a left protrusion 21A of an upper frame 20, and further can transmit the lateral load F to a side deck 23B of the upper frame 20 via the rear lower frame 32 of the rear wall 30B or the lower wall 30U. The lower pillar part 66 extends downward from the right end 63 of the beam part 65 in the second modification shown in FIG. 8, but may extend downward from an intermediate portion of the beam part 65, i.e., from a portion between the right end 63 of the beam part 65 and the left end of the beam part 65.

A connection portion between the right end 63 of the beam part 65 and the upper end of the lower pillar part 66 has a curving shape. The connection portion is smoothly and elastically deformable in a bending direction. Thus, a spring effect is attainable in the connection portion. As a result, the load transmitting member can effectively absorb a part of energy of the lateral load when the lateral load is applied to the upper portion of the cabin.

The lower pillar part 66 may have a right surface in contact with the first right rear pillar 38, and the right surface may be welded to the right rear pillar 38. The lower pillar part 66 may have a lower end in contact with the rear lower frame 32 or the lower wall 30U, and the lower end may be welded to the rear lower frame 32 or the lower wall 30U.

The remaining structures of the hydraulic excavator 10 according to the second modification are equivalent to those of the hydraulic excavator 10 according to the first embodiment described with reference to FIGS. 1 to 6.

Figure 9:
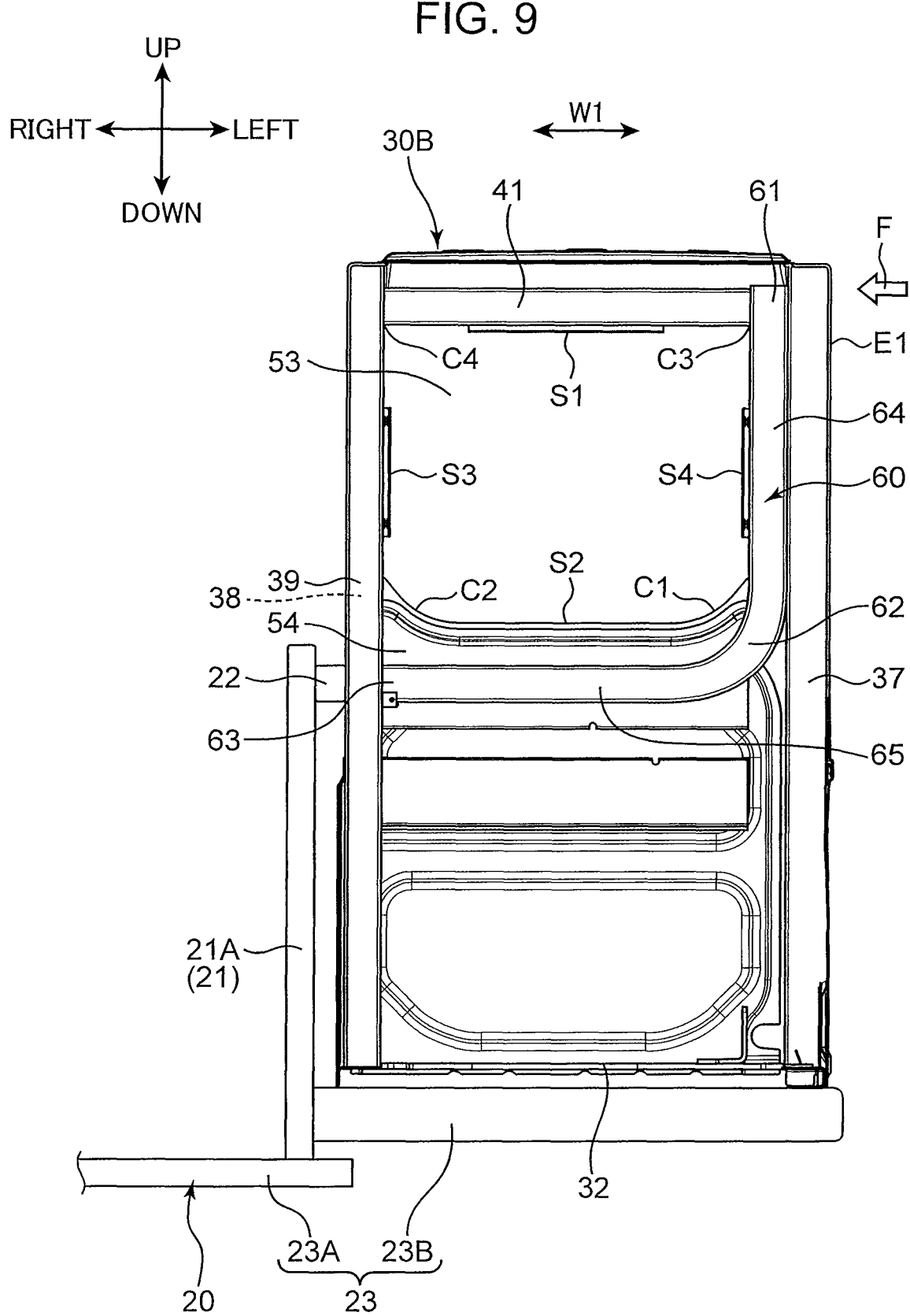
FIG. 9 is a front view showing a rear wall and a load transmitting member of a cabin in a working machine according to a third modification of the first embodiment.

FIG. 9 is a front view showing a rear wall 30B and a load transmitting member 60 of a cabin 30 in a hydraulic excavator 10 according to a third modification of the first embodiment. As shown in FIG. 9, a beam part 65 in the third modification has a shape linearly and substantially horizontally extending rightward, i.e., inward in a wall width direction W1 (inward in a width direction W) from an inner end of an intermediate part 62. The remaining structures of the hydraulic excavator 10 according to the third modification are equivalent to those of the hydraulic excavator 10 according to the first embodiment described with reference to FIGS. 1 to 6.

Although unillustrated, the beam part of the load transmitting member may have a shape extending linearly or curvingly inward in the width direction W from the right end (inner end) of the intermediate part while advancing diagonally upward toward the frame forming member. Even in this case, the beam part extends inward in the width direction from the inner end of the intermediate part that is an end thereof on the inner side in the width direction W toward the frame forming member under the rear window.

Although the frame forming member includes the left protrusion 21A of the boom supporting part 21 and the coupling member 22 in the first embodiment, the frame forming member in the present disclosure only needs to form a part of the upper frame 20 and receive a load transmitted via the load transmitting member 60 when the cabin 30 is rolled or turned over. Thus, the frame forming member may be composed of a member other than the left protrusion 21A and the coupling member 22. Examples of the frame forming member include a side deck 23B of an upper frame 20 as shown in fourth to eighth modifications (FIGS. 10 to 16) to be described later.

Although the cabin 30 has the left rear pillar 37 (outer pillar) in the first embodiment, the outer pillar is excludable for a relatively small working machine.

The technique according to the present disclosure is applicable to various working machines in addition to the hydraulic excavator 10.

Although the upper pillar part 64, the intermediate part 62, and the beam part 65 of the load transmitting member 60 are in contact with the rear wall 30B in the first embodiment, at least one of the intermediate part 62 and the beam part 65 of the load transmitting member 60 may not be in contact with the rear wall 30B.

In the first embodiment, the right end 63 (the right end 63 of the beam part 65) that is the inner end of the load transmitting member 60 on the inner side thereof in the width direction W is connected to the first right rear pillar 38. In this connection, the load transmitting member 60 can transmit the lateral load F, which is applied from the left to the upper portion of the cabin 30, to the left protrusion 21A of the frame forming member. However, the present disclosure should not be limited to this aspect. The right end 63 of the load transmitting member 60 may be directly connected to the frame forming member. In this case, the first right rear pillar 38 may have an upper pillar part and a lower pillar part, and the beam part 65 of the load transmitting member 60 may be disposed between the upper pillar part and the lower pillar part. Even in this case, the load transmitting member 60 can transmit the lateral load F, which is applied from the left to the upper portion of the cabin 30, to the left protrusion 21A of the frame forming member.

Furthermore, the first right rear pillar 38 may have an upper pillar part, a lower pillar part, and an intermediate pillar part therebetween to be aligned in the up-down direction, and the right end 63 of the load transmitting member 60 may be connected to the intermediate pillar part of the first right rear pillar 38. In this case, the intermediate pillar part preferably has the stiffness higher than those of the upper pillar part and the lower pillar part.

The coupling member 22 shown in each of FIGS. 6 to 9 is excludable. In this case, the right end 63 of the load transmitting member 60 may be directly connected to the left protrusion 21A of the frame forming member, or the first right rear pillar 38 may be directly coupled to the left protrusion 21A of the frame forming member, as described above. Moreover, in the absence of the coupling member 22, the cabin 30 may be disconnected from the left protrusion 21A, and the cabin 30 may be spaced away from the left protrusion 21A in the width direction (left-right direction). Even in this case, the left protrusion 21A is adjacent to the cabin 30 at an inner position in the width direction W with respect to the the cabin 30 (i.e., to the right of the cabin 30). Hence, when the lateral load F shown in each of FIGS. 6 to 9 is applied to the upper portion of the cabin 30, an entirety of the cabin 30 slightly deforms rightward (inward in the width direction W) to thereby allow a right portion of the cabin 30 to come into contact with the left protrusion 21A. The load transmitting member 60 can accordingly transmit the lateral load F to the left protrusion 21A serving as the frame forming member.

Figure 10:
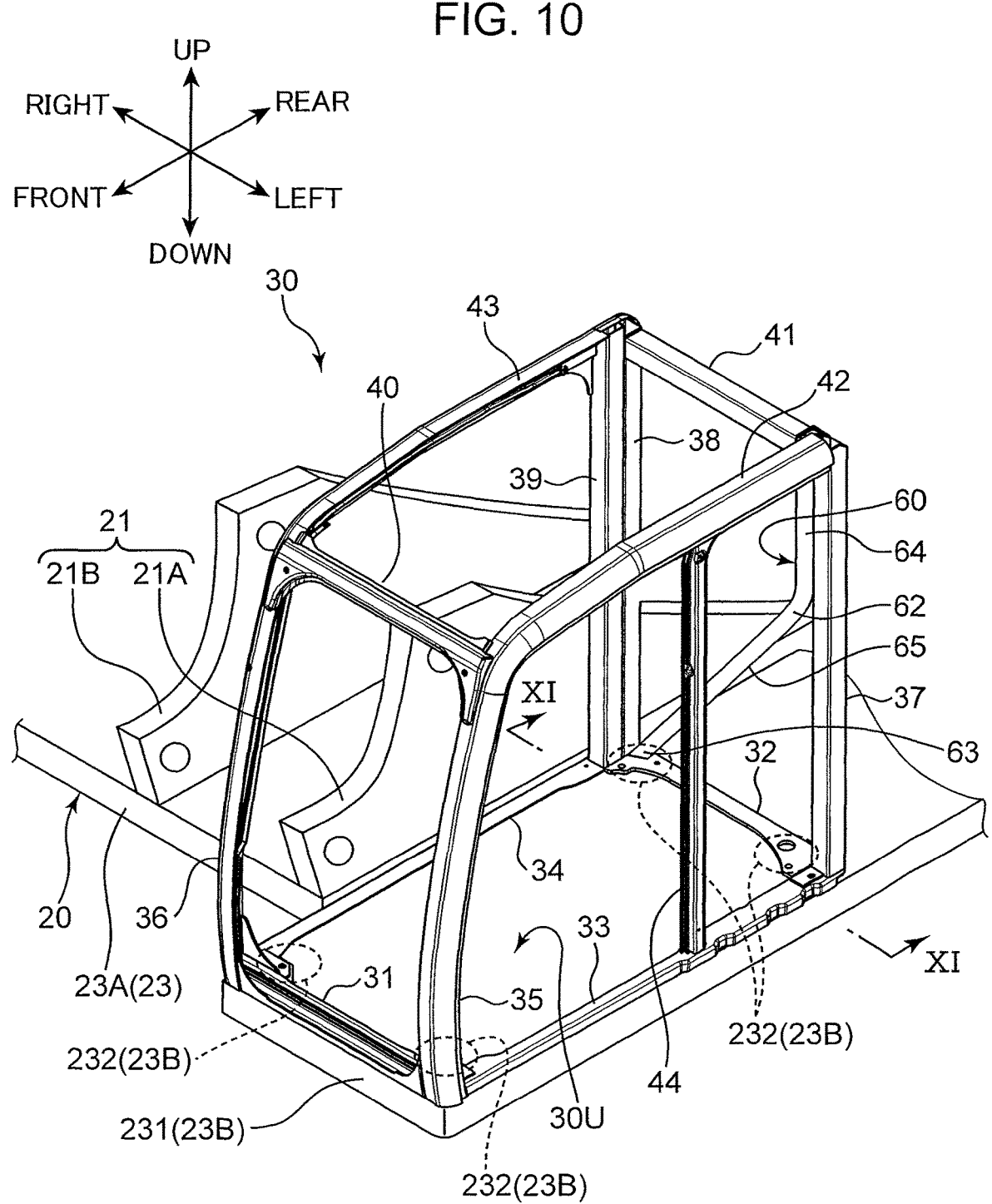
FIG. 10 is a perspective view showing a cabin and a part of an upper frame in a working machine according to a fourth modification of the first embodiment.
Figure 11:
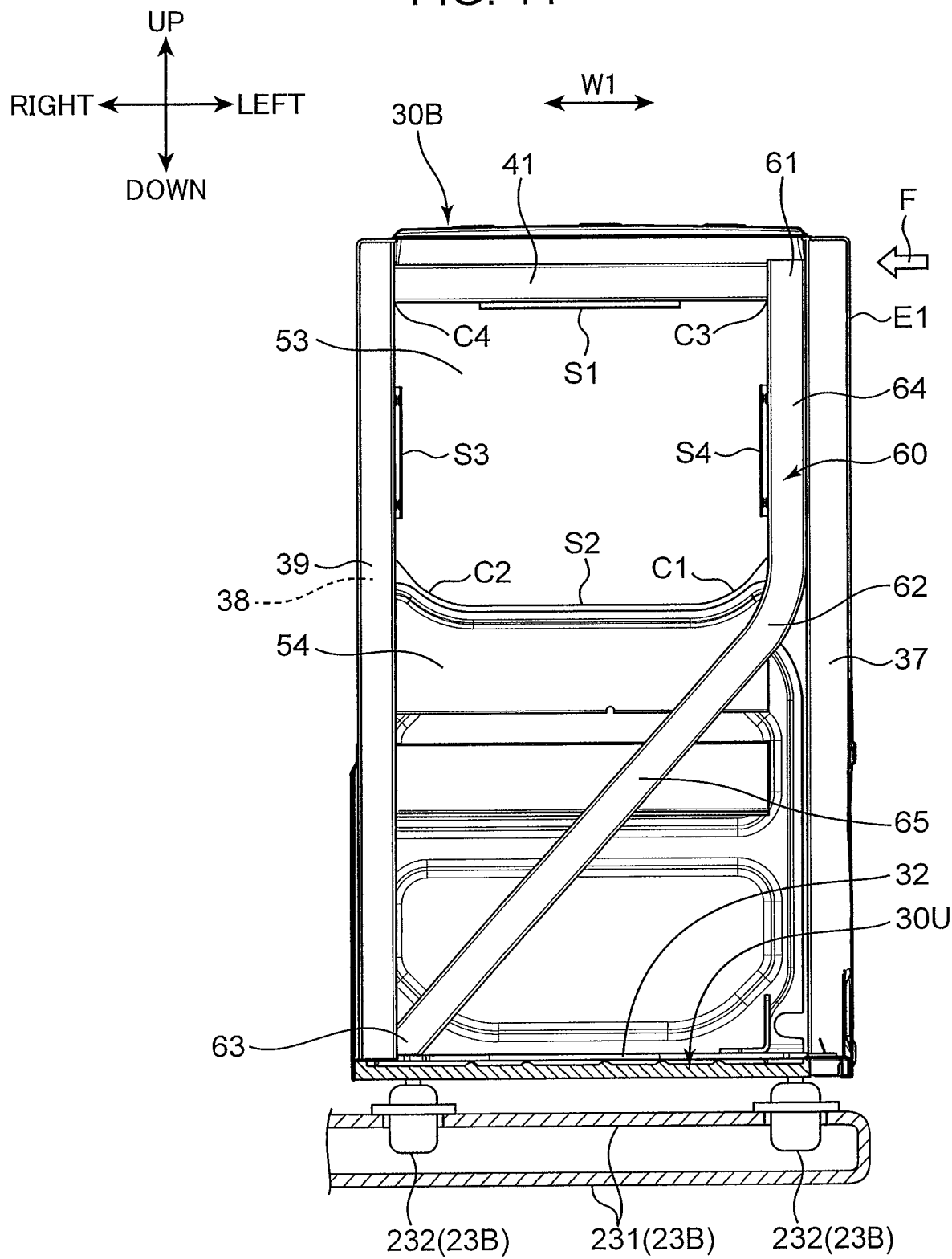
FIG. 11 is a cross-sectional view taken along the line XI-XI in FIG. 10.

FIG. 10 is a perspective view showing a cabin 30 and a part of an upper frame 20 in a hydraulic excavator 10 according to a fourth modification of the first embodiment. FIG. 11 is a cross-sectional view taken along the line XI-XI in FIG. 10.

The hydraulic excavator 10 according to the fourth modification differs from the hydraulic excavator 10 according to the first embodiment shown in FIGS. 1 to 6 in that a load transmitting member 60 includes a beam part 65 extending in a direction to a mount to be described later. The remaining structures of the hydraulic excavator 10 according to the fourth modification are equivalent to those in the first embodiment described with reference to FIGS. 1 to 6.

In the hydraulic excavator 10 according to the fourth modification shown in FIG. 10, an upper frame 20 includes a frame main body 23 and a boom supporting part 21, and the frame main body 23 has a center section 23A and a side deck 23B, like the hydraulic excavator 10 shown in FIG. 5. As shown in FIGS. 10 and 11, the side deck 23B has a deck main body 231 and a plurality of mounts 232 (e.g., four mounts 232). The deck main body 231 is supported by the center section 23A and arranged just under a lower wall 30U of a cabin 30. For instance, the deck main body 231 has such a size and a shape as to cover the lower wall 30U of the cabin 30 from below. The four mounts 232 serve as anti-vibration mounts for suppressing the vibration of the cabin 30. The four mounts 232 are arranged respectively in positions corresponding to four corners of the lower wall 30U of the cabin 30, as denoted by four dashed-circles in FIG. 10. The four mounts 232 are arranged between the lower wall 30U of the cabin 30 and the deck main body 231 to support the cabin 30. As shown in FIG. 11, each of the four mounts 232 is supported by the deck main body 231.

The load transmitting member 60 has a lower end 63 (right end 63) located just above a right rear mount 232 at a right-rear position among the four mounts 232, and connected to a lower portion of the cabin 30. The lower end 63 of the load transmitting member 60 is connected to the lower portion of the cabin 30 at such a position as to overlap the right rear mount 232 in a plan view. In the specific example shown in FIG. 10, the lower portion of the cabin 30 to which the lower end 63 of the load transmitting member 60 is connected serves as a portion including a boundary between a first right rear pillar 38 and a rear lower frame 32. However, the lower end 63 of the load transmitting member 60 may be connected only to the rear lower frame 32 or only to the lower wall 30U. The right rear mount 232 serves as an exemplary specific mount.

In the hydraulic excavator 10 according to the fourth modification, the lower end 63 of the load transmitting member 60 is arranged just above the right rear mount 232 of the upper frame 20. Therefore, the load transmitting member 60 can efficiently transmit a lateral load F, which is applied from the left to an upper portion of the cabin 30, to the right rear mount 232 of the upper frame 20.

Figure 12:
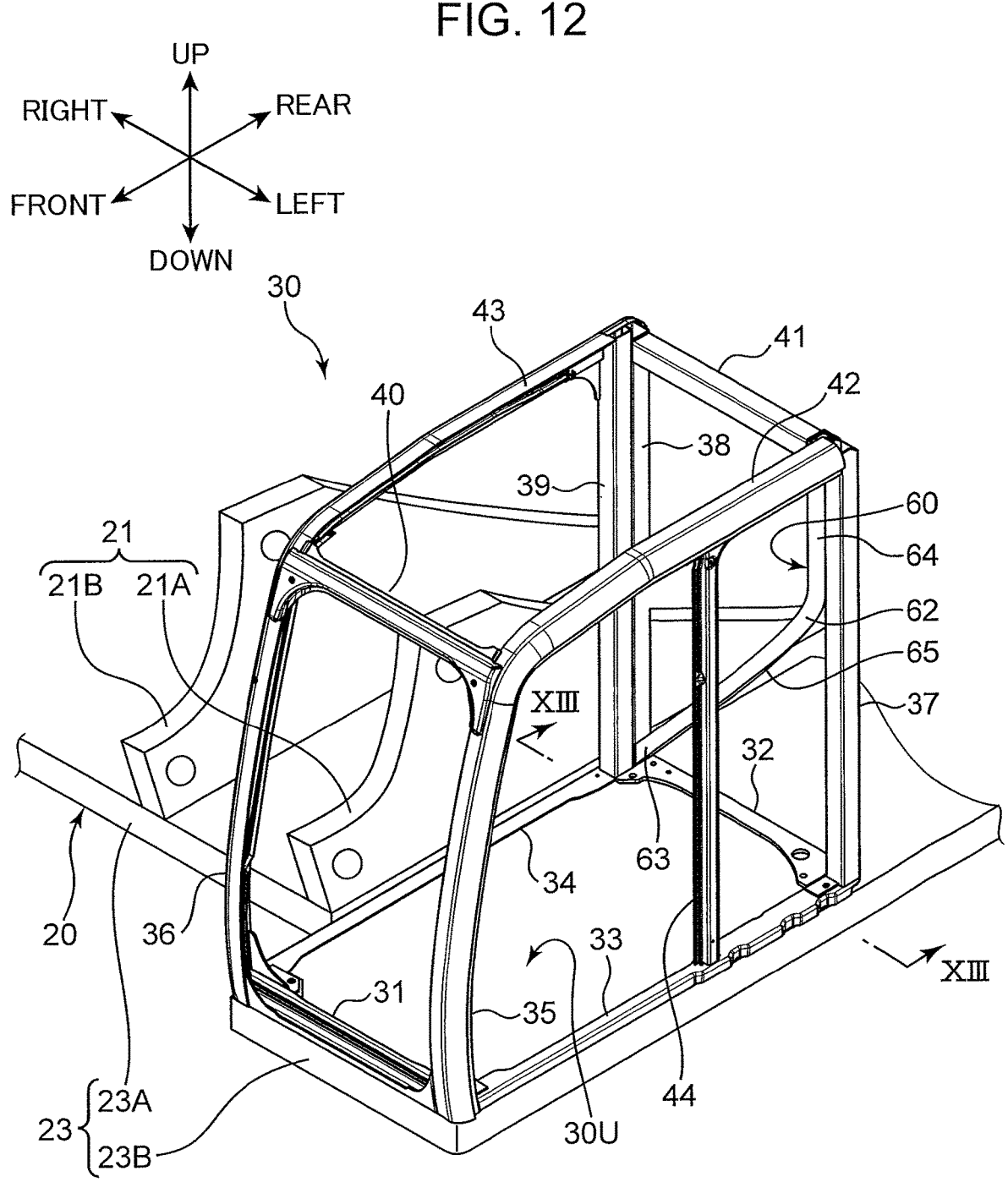
FIG. 12 is a perspective view showing a cabin and a part of an upper frame in a working machine according to a fifth modification of the first embodiment.
Figure 13:
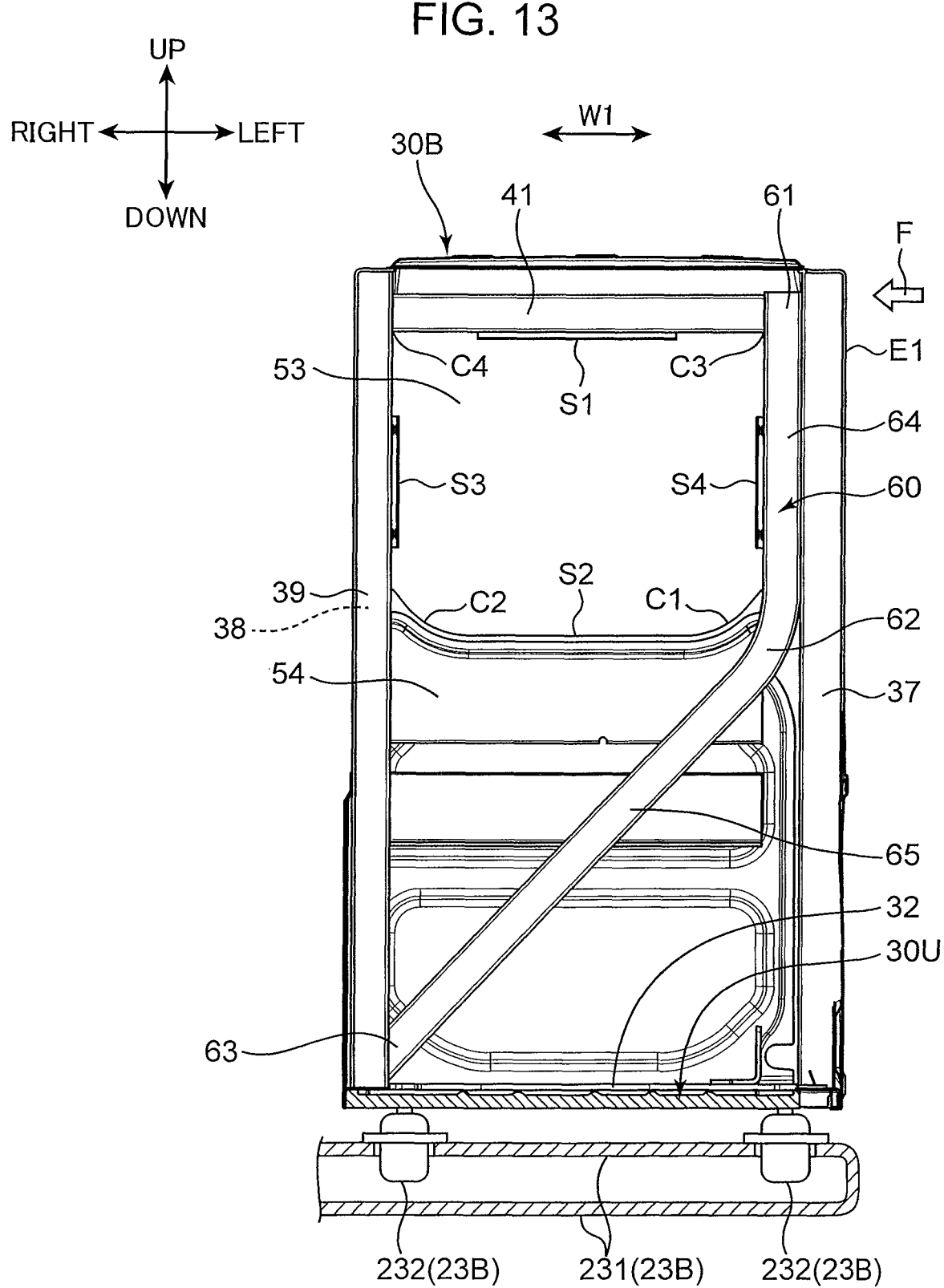
FIG. 13 is a cross-sectional view taken along the line XIII-XIII in FIG. 12.

FIG. 12 is a perspective view showing a cabin 30 and a part of an upper frame 20 in a hydraulic excavator 10 according to a fifth modification of the first embodiment. FIG. 13 is a cross-sectional view taken along the line XIII-XIII in FIG. 12.

The hydraulic excavator 10 according to the fifth modification differs from the hydraulic excavator 10 according to the first embodiment shown in FIGS. 1 to 6 in that a load transmitting member 60 includes a beam part 65 extending in a direction to a lower end of a first right rear pillar 38. The remaining structures of the hydraulic excavator 10 according to the fifth modification are equivalent to those in the first embodiment described with reference to FIGS. 1 to 6.

In the hydraulic excavator 10 according to the fifth modification, the load transmitting member 60 has a lower end 63 connected to the lower end of the first right rear pillar 38. Therefore, the load transmitting member 60 can transmit a lateral load F, which is applied from the left to an upper portion of the cabin 30, to a side deck 23B of the upper frame 20 via the first right rear pillar 38. Here, the beam part 65 of the load transmitting member 60 may extend in a direction to a lower end of the second right rear pillar 39. In this case, the lower end 63 of the load transmitting member 60 is connected to the lower end of the second right rear pillar 39.

Figure 14:
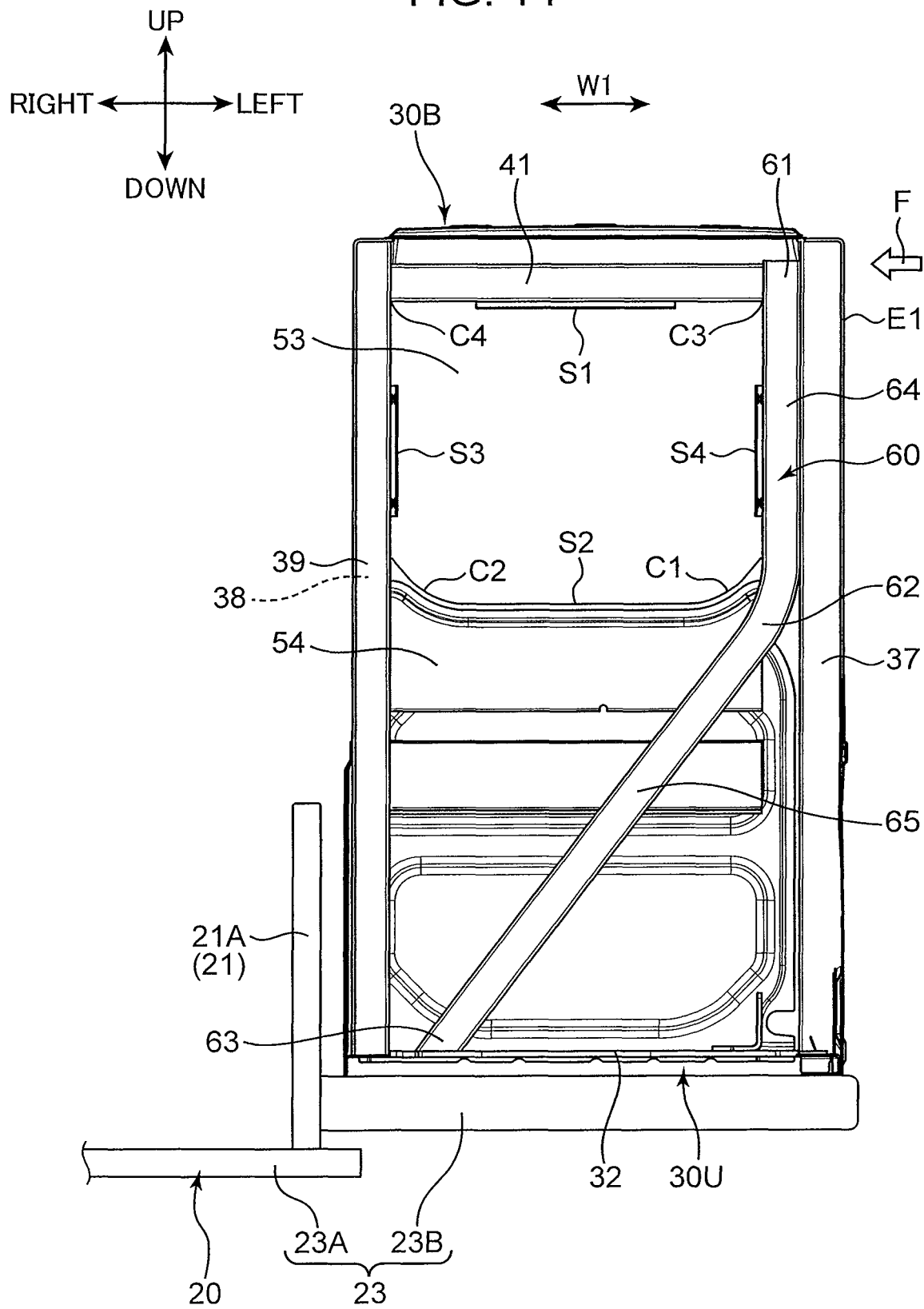
FIG. 14 is a front view showing a rear wall and a load transmitting member of a cabin in a working machine according to a sixth modification of the first embodiment.

FIG. 14 is a front view showing a rear wall 30B and a load transmitting member 60 of a cabin 30 in a hydraulic excavator 10 according to a sixth modification of the first embodiment.

The hydraulic excavator 10 according to the sixth modification differs from the hydraulic excavator 10 according to the first embodiment shown in FIGS. 1 to 6 in that the load transmitting member 60 includes a beam part 65 extending in a direction to a position to the left of the first right rear pillar 38 in a lower portion of the cabin 30. The remaining structures of the hydraulic excavator 10 according to the sixth modification are equivalent to those in the first embodiment described with reference to FIGS. 1 to 6.

In the hydraulic excavator 10 according to the sixth modification, the load transmitting member 60 has a lower end 63 connected to a rear lower frame 32. Specifically, the lower end 63 of the load transmitting member 60 is connected to the rear lower frame 32 at a position closer to a lower end of the first right rear pillar 38 than a lower end of a left rear pillar 37. In the sixth modification, the load transmitting member 60 can transmit a lateral load F, which is applied from the left to an upper portion of the cabin 30, to a side deck 23B of an upper frame 20 via the rear lower frame 32.

Figure 15:
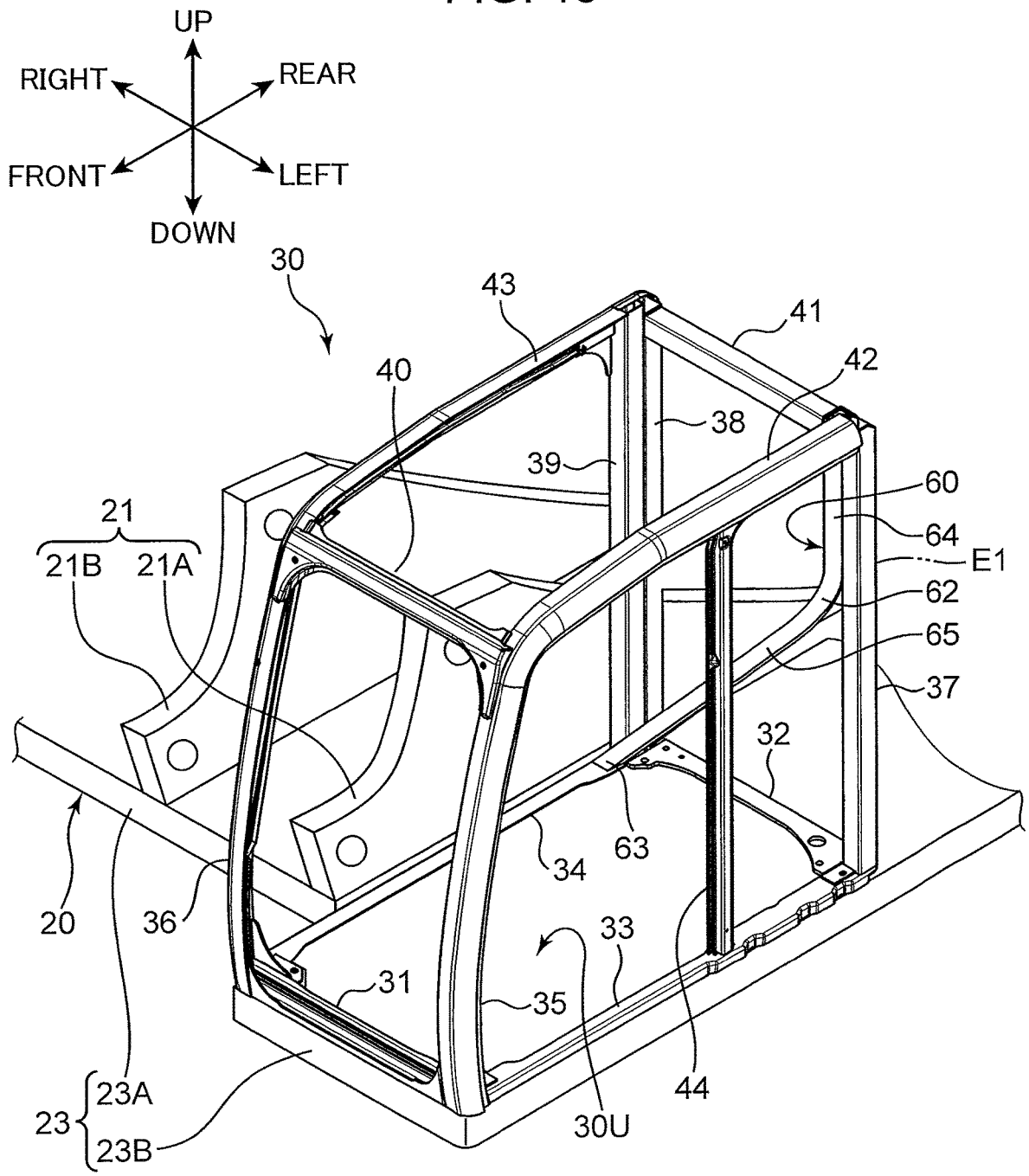
FIG. 15 is a perspective view showing a cabin and a part of an upper frame in a working machine according to a seventh modification of the first embodiment.

FIG. 15 is a perspective view showing a cabin 30 and a part of an upper frame 20 in a hydraulic excavator 10 according to a seventh modification of the first embodiment.

The hydraulic excavator 10 according to the seventh modification differs from the hydraulic excavator 10 according to the first embodiment shown in FIGS. 1 to 6 in that a load transmitting member 60 includes a beam part 65 extending in a direction to a position in front of the right rear pillars 38, 39 in a lower portion of the cabin 30. The remaining structures of the hydraulic excavator 10 according to the seventh modification are equivalent to those in the first embodiment described with reference to FIGS. 1 to 6.

In the hydraulic excavator 10 according to the seventh modification, the load transmitting member 60 has a lower end 63 connected to a lower portion of the cabin 30 at a position in front of the second right rear pillar 39. Specifically, the lower end 63 of the load transmitting member 60 is connected to a right lower frame 34 at a position in front of the second right rear pillar 39. More specifically, the lower end 63 of the load transmitting member 60 is connected to the right lower frame 34 to be adjacent to a lower end of the second right rear pillar 39 in the front-rear direction. In the seventh modification, the load transmitting member 60 can transmit a lateral load F, which is applied from the left to an upper portion of the cabin 30, to a side deck 23B of the upper frame 20 via the right lower frame 34.

Figure 16:
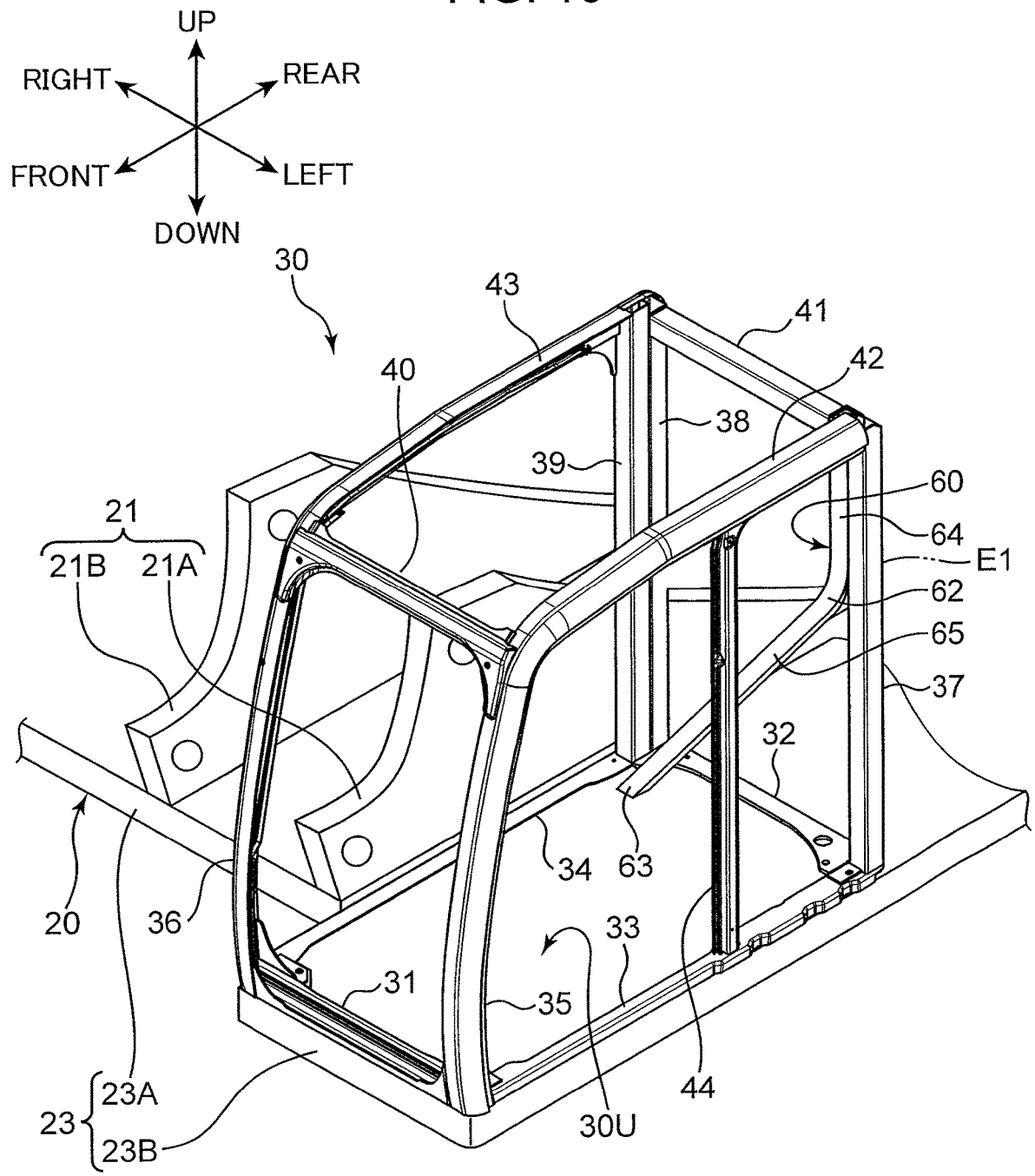
FIG. 16 is a perspective view showing a cabin and a part of an upper frame in a working machine according to an eighth modification of the first embodiment.

FIG. 16 is a perspective view showing a cabin 30 and a part of an upper frame 20 in a hydraulic excavator 10 according to an eighth modification of the first embodiment.

The hydraulic excavator 10 according to the eighth modification differs from the hydraulic excavator 10 according to the first embodiment shown in FIGS. 1 to 6 in that a load transmitting member 60 includes a beam part 65 extending in a direction to a lower wall 30U (bottom surface of the lower wall 30U). The remaining structures of the hydraulic excavator 10 according to the eighth modification are equivalent to those in the first embodiment described with reference to FIGS. 1 to 6.

In the hydraulic excavator 10 according to the eighth modification, the load transmitting member 60 has a lower end 63 connected to the lower wall 30U at a position in front of a rear lower frame 32. Specifically, the lower end 63 of the load transmitting member 60 is connected to the lower wall 30U at a position closer to a lower end of the first right rear pillar 38 than a lower end of the left rear pillar 37. In the eighth modification, the load transmitting member 60 can transmit a lateral load F, which is applied from the left to an upper portion of the cabin 30, to a side deck 23B of the upper frame 20 via the lower wall 30U.

In the fourth to eighth modifications, the side deck 23B including the deck main body 231 and the plurality of mounts 232 serves as an exemplary frame forming member which forms a part of the upper frame 20. The coupling member 22 shown in each of FIGS. 6 to 9 is omitted in each of the fourth to eighth modifications 4 to 8.

Second Embodiment

Figure 17:
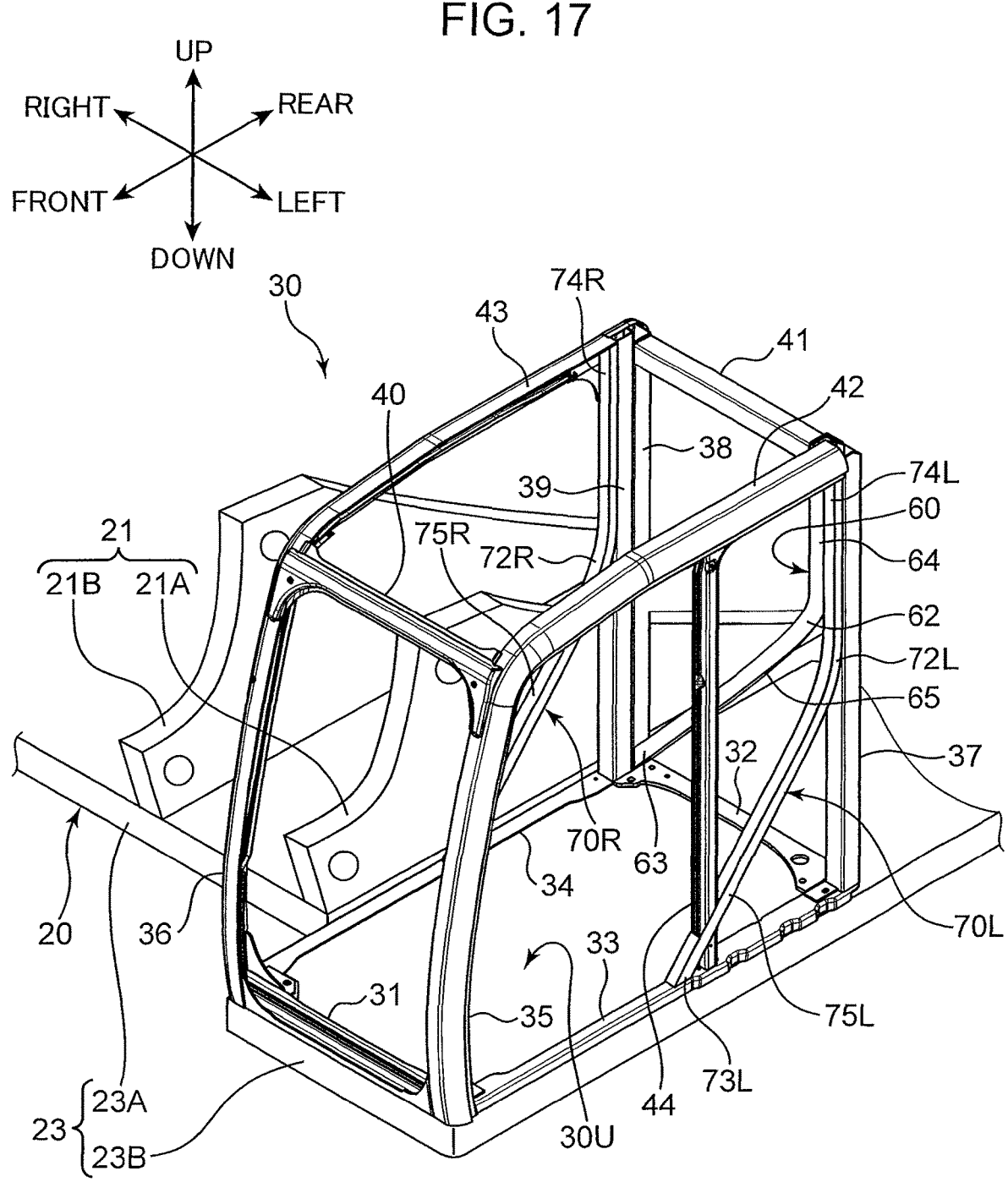
FIG. 17 is a perspective view showing a cabin and a part of an upper frame in a working machine according to a second embodiment.
Figure 18:
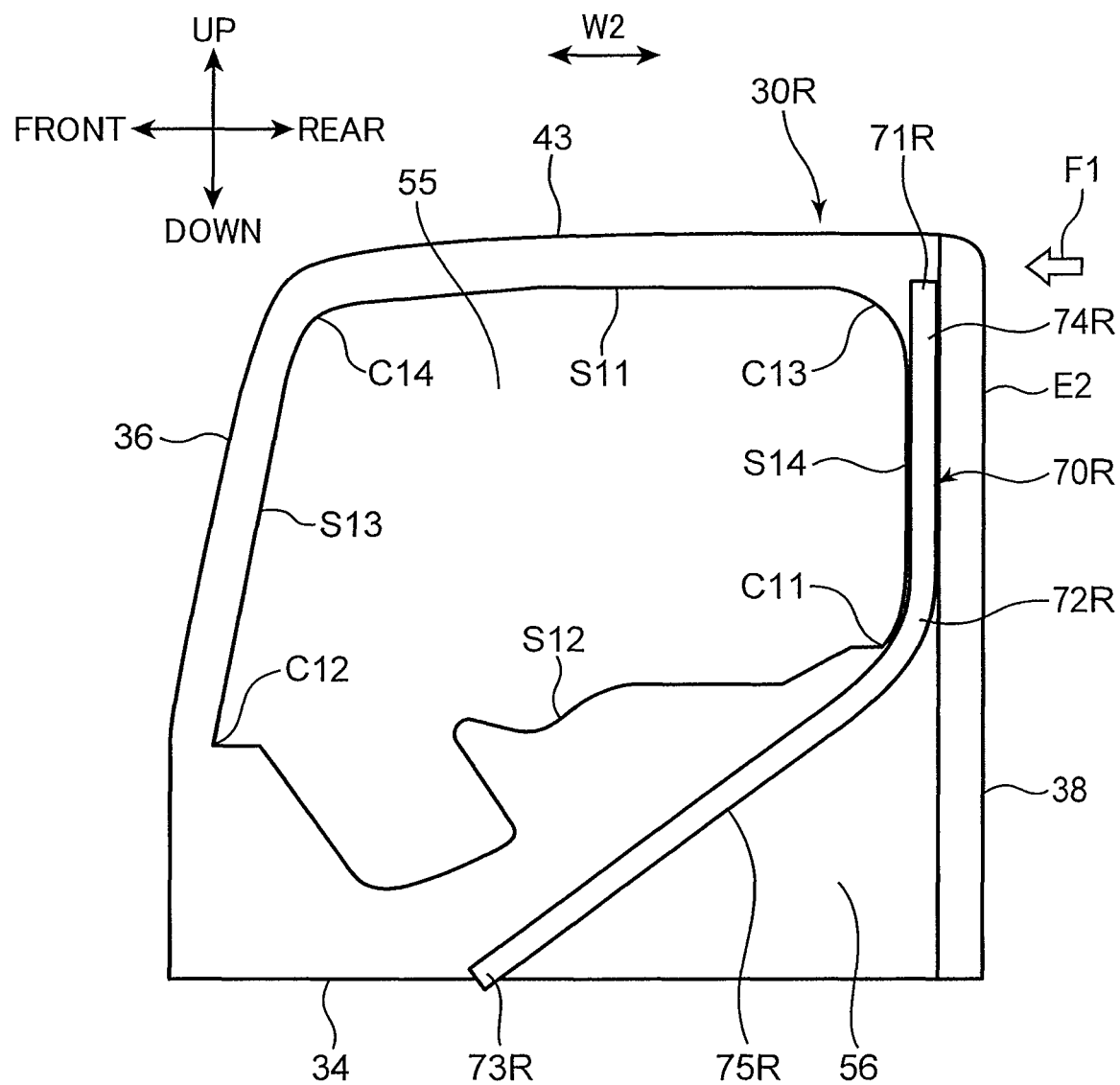
FIG. 18 is a side view showing a right wall and a load transmitting member of the cabin in the working machine according to the second embodiment.
Figure 19:
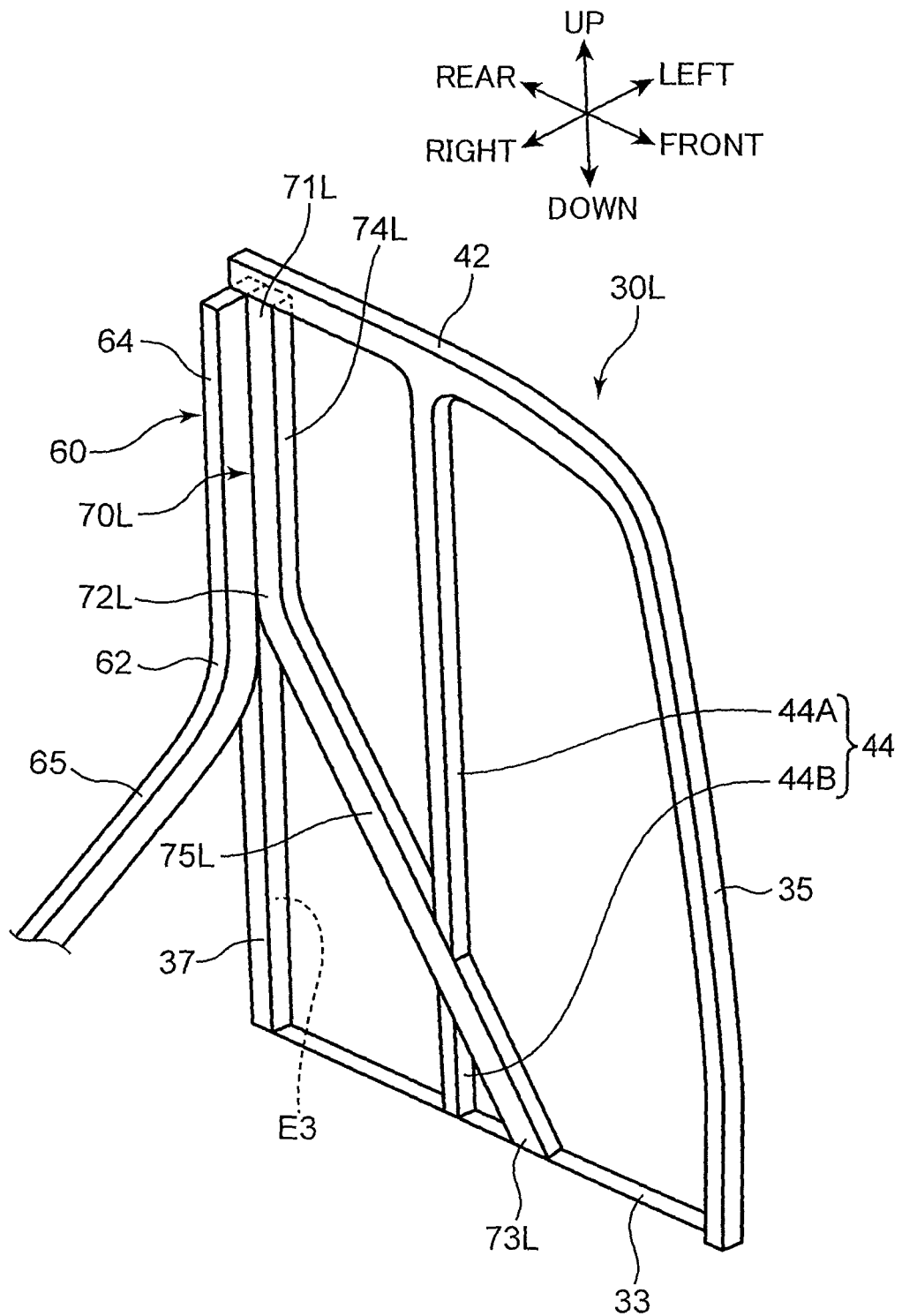
FIG. 19 is a perspective view showing a left wall and the load transmitting member of the cabin in the working machine according to the second embodiment.
Figure 20:
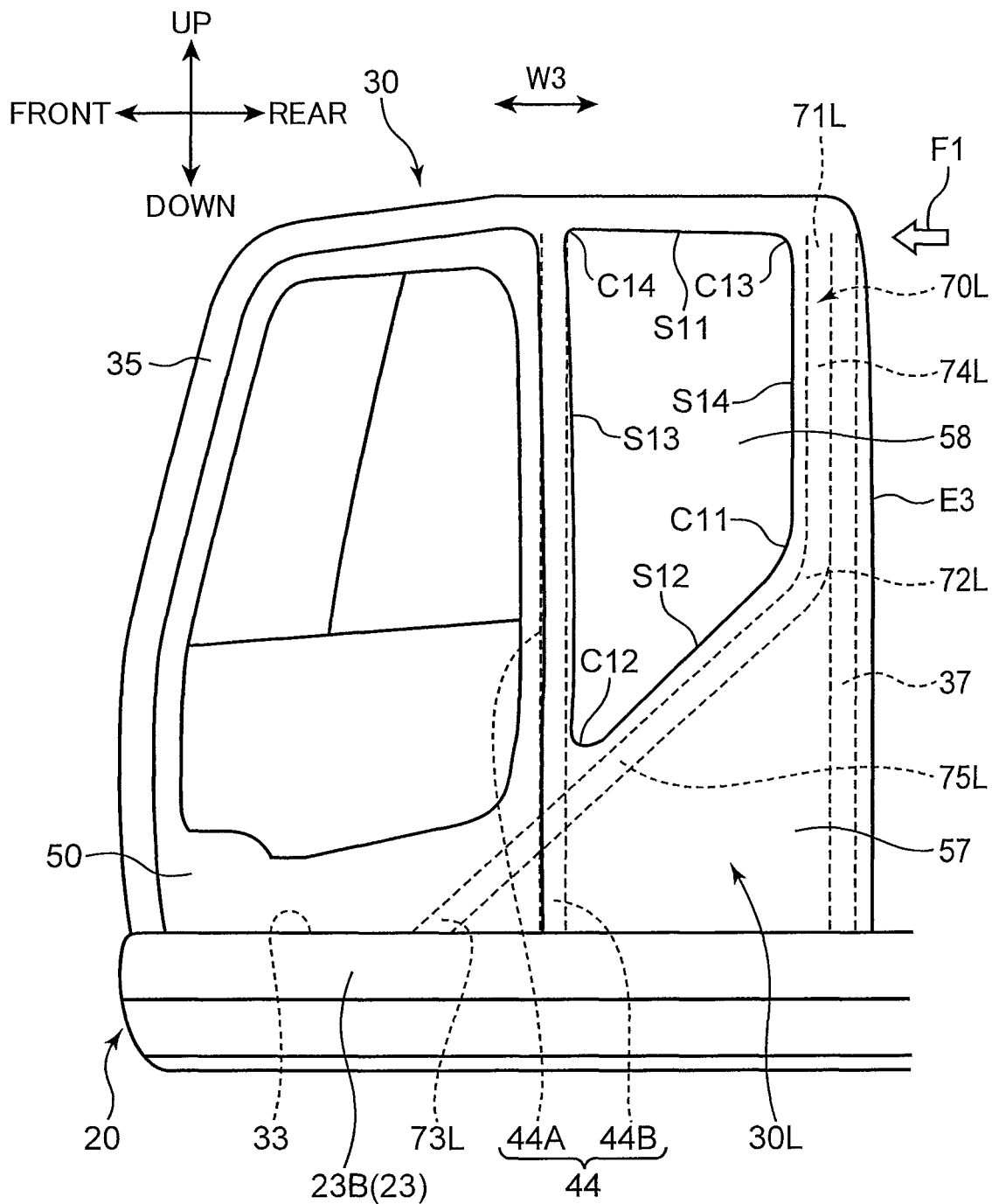
FIG. 20 is a side view showing the left wall and the load transmitting member of the cabin in the working machine according to the second embodiment.

FIG. 17 is a perspective view showing a cabin 30 and a part of an upper frame 20 in a hydraulic excavator 10 according to a second embodiment. FIG. 18 is a side view showing a right wall 30R and a load transmitting member 70R of the cabin 30. FIG. 19 is a perspective view showing a left wall 30L and a load transmitting member 70L of the cabin 30. FIG. 20 is a side view showing the left wall 30L and the load transmitting member 70L.

The hydraulic excavator 10 according to the second embodiment differs from the hydraulic excavator 10 according to the first embodiment shown in FIGS. 1 to 6 in that the cabin 30 includes the load transmitting members 70R, 70L. The remaining structures of the hydraulic excavator 10 according to the second embodiment are equivalent to those in the first embodiment described with reference to FIGS. 1 to 6.

As shown in FIG. 18, the right wall 30R is located to the right of an inner space to stand upward from a side deck 23B of a frame main body 23 in the upper frame 20, and forms a right surface of the cabin 30. The right wall 30R serves as an exemplary specific wall. The right wall 30R includes a right panel 56. The right panel 56 is provided to close at least a part of the region surrounded by a right front pillar 36, a right upper beam 43, a right rear pillar 38, and a right lower frame 34. The right panel 56 has an opening in an upper portion thereof. The opening of the right panel 56 serves as a right window 55. The right panel 56 has a window edge defining the right window 55 (opening). A window glass is fit to the window edge. The right window 55 serves as an exemplary side window.

The right panel 56 of the right wall 30R has a wall side edge E2 serving as a side edge located at a rear end of the right wall 30R in a wall width direction W2 which is a width direction of the right wall 30R, the wall side edge E2 extending in a lengthwise direction. The wall width direction W2 of the right wall 30R corresponds to the front-rear direction. The lengthwise direction in which the wall side edge E2 extends may correspond to the up-down direction or a direction inclined to the up-down direction. The wall side edge E2 may extend from an upper end to a lower end of the right wall 30R while changing its extension direction, and the concept of the lengthwise direction covers this aspect.

The window edge of the right wall 30R has an upper section S11, a lower section S12, a front section S13, and a rear section S14. The rear section S14 serves as an exemplary lengthwise section. The rear section S14 extends in a direction along the wall side edge E2 of the right wall 30R, and the lower section S12 extends in a direction intersecting the direction in which the rear section S14 extends. The window edge of the right wall 30R further has a rear lower corner C11 connecting the rear section S14 and the lower section S12 with each other, a front lower corner C12 connecting the front section S13 and the lower section S12 with each other, a rear upper corner C13 connecting the rear section S14 and the upper section S11 with each other, and a front upper corner C14 connecting the front section S13 and the upper section S11 with each other. The rear lower corner C11 serves as an exemplary lower corner.

The upper section S11 and the lower section S12 are located at a distance therebetween in the up-down direction. The upper section S11 extends in the front-rear direction. In the specific example shown in FIG. 18, the lower section S12 has a shape extending frontward while undulating upward and downward from the rear lower corner C11 to the front lower corner C12. However, the shape of the lower section S12 is not limited to the specific example, and may be, for example, a shape linearly extending in the front-rear direction. The front section S13 extends in a lengthwise direction in front of the upper section S11 and the lower section S12. The rear section S14 extends in a lengthwise direction at the back of the upper section S11 and the lower section S12. In the specific example shown in FIG. 18, the lengthwise direction in which the front section S13 extends corresponds to a direction inclined to the up-down direction, and the lengthwise direction in which the rear section S14 extends corresponds to the up-down direction. However, the lengthwise direction in which the front section S13 extends may correspond to the up-down direction, and the lengthwise direction in which the rear section S14 extends may correspond to a direction inclined to the up-down direction.

As shown in FIG. 20, the left wall 30L is located to the left of the inner space to stand upward from the side deck 23B of the frame main body 23 in the upper frame 20, and forms a left surface of the cabin 30. The left wall 30L is an exemplary specific wall. The left wall 30L includes a door 50 and a left rear panel 57. The door 50 is provided to close a front region between a left front pillar 35 and a left intermediate pillar 44. The left rear panel 57 is provided to close at least a part of a rear region between the left intermediate pillar 44 and a left rear pillar 37. The left rear panel 57 has an opening in an upper portion thereof. The opening of the left rear panel 57 serves as a left rear window 58 (left window). The left rear panel 57 has a window edge defining the left rear window 58. A window glass is fit to the window edge. The left rear window 58 serves as an exemplary side window.

The left rear panel 57 of the left wall 30L has a wall side edge E3 serving as a side edge located at a rear end of the left wall 30L in a wall width direction W3 (see FIG. 20) which is a width direction of the left wall 30L, the wall side edge E3 extending in a lengthwise direction. The wall width direction W3 of the left wall 30L corresponds to the front-rear direction. The lengthwise direction in which the wall side edge E3 extends may correspond to the up-down direction or a direction inclined to the up-down direction. The wall side edge E3 may extend from an upper end to a lower end of the left wall 30L while changing its extension direction, and the concept of the lengthwise direction covers this aspect.

The window edge of the left rear panel 57 has an upper section S11, a lower section S12, a front section S13, and a rear section S14. The rear section S14 serves as an exemplary lengthwise section. The rear section S14 extends in a direction along the wall side edge E3 of the left wall 30L, and the lower section S12 extends in a direction intersecting the direction in which the rear section S14 extends. The window edge of the left wall 30L further has a rear lower corner C11 connecting the rear section S14 and the lower section S12 with each other, a front lower corner C12 connecting the front section S13 and the lower section S12 with each other, a rear upper corner C13 connecting the rear section S14 and the upper section S11 with each other, and a front upper corner C14 connecting the front section S13 and the upper section S11 with each other. The rear lower corner C11 serves as an exemplary lower corner.

The upper section S11 and the lower section S12 are located at a distance therebetween in the up-down direction. The upper section S11 extends in the front-rear direction. In the specific example shown in FIG. 20, the lower section S12 has such a posture as to extend frontward and downward from the rear lower corner C11 to the front lower corner C12. Specifically, the lower section S12 is inclined with respect to a horizontal plane so as to advance downward as advancing from the rear lower corner C11 to the front lower corner C12. However, the shape of the lower section S12 is not limited to the specific example, and may be, for example, a shape linearly and horizontally extending in the front-rear direction, or a shape undulating like the lower section S12 of the window edge of the right wall 30R shown in FIG. 18. The front section S13 extends in a lengthwise direction in front of the upper section S11 and the lower section S12. The rear section S14 extends in a lengthwise direction at the back of the upper section S11 and the lower section S12. In the specific example shown in FIG. 20, the lengthwise direction in which each of the front section S13 and the rear section S14 extends corresponds to the up-down direction. However, the lengthwise direction in which each of the sections extends may correspond to a direction inclined to the up-down direction.

The right load transmitting member 70R is fixedly attached to at least one of the right panel 56 of the right wall 30R, the first right rear pillar 38, the second right rear pillar 39, and a lower portion of the cabin 30. The left load transmitting member 70L is fixedly attached to at least one of the left rear panel 57 of the left wall 30L, the left rear pillar 37, and a lower portion of the cabin 30. The right load transmitting member 70R includes an upper pillar part 74R, an intermediate part 72R, and a beam part 75R. The left load transmitting member 70L includes an upper pillar part 74L, an intermediate part 72L, and a beam part 75L.

As shown in FIG. 18, the upper pillar part 74R of the right load transmitting member 70R extends downward from an upper portion of the right wall 30R along the rear section S14 at the back of the rear section S14 of the window edge in the right wall 30R, i.e., at an outer position in the wall width direction W2 than the rear section S14. The intermediate part 72R extends to circumvent the right window 55 from a rear-upper position to a front-lower position. The rear-upper position is located above the rear lower corner C11 and at the back of the rear lower corner C11, i.e., at an outer position in the wall width direction W2 than the rear lower corner C11. The front-lower position is located below the rear lower corner C11 and in front of the rear lower corner C11, i.e., at an inner position in the wall width direction W2 than the rear lower corner C11. The beam part 75R extends from the intermediate part 72R so as to be farther away from the wall side edge E2. Specifically, the beam part 75R extends frontward and downward under the right window 55 from a front end of the intermediate part 72R that is on a front side thereof toward the side deck 23B forming a part of the upper frame 20. The side deck 23B serves as an exemplary frame forming member which forms a part of the upper frame 20.

As shown in FIGS. 19 and 20, the upper pillar part 74L of the left load transmitting member 70L extends downward from an upper portion of the left wall 30L along the rear section S14 at the back of the rear section S14 of the window edge in the left wall 30L, i.e., at an outer position in the wall width direction W3 than the rear section S14. The intermediate part 72L extends to circumvent the left rear window 58 from a rear-upper position to a front-lower position. The rear-upper position is located above the rear lower corner C11 and at the back of the rear lower corner C11, i.e., at an outer position in the wall width direction W3 than the rear lower corner C11. The front-lower position is located below the rear lower corner C11 and in front of the rear lower corner C11, i.e., at an inner position in the wall width direction W3 than the rear lower corner C11. The beam part 75L extends from the intermediate part 72L so as to be farther away from the wall side edge E3. Specifically, the beam part 75L extends frontward and downward under the left rear window 58 from a front end of the intermediate part 72L that is on a front side thereof toward the side deck 23B forming a part of the upper frame 20. The side deck 23B serves as an exemplary frame forming member which forms a part of the upper frame 20.

In the embodiment, an entirety of the right load transmitting member 70R is made of a single member, and an entirety of the left load transmitting member 70L is made of a single member. In other words, each of the load transmitting members 70R, 70L is not formed of a plurality of members sequentially welded to each other. Therefore, the right load transmitting member 70R has no welded part in the intermediate part 72R located in the corner adjacent portion around the rear lower corner C11 of the window edge in the right wall 30R. Similarly, the left load transmitting member 70L has no welded part in the intermediate part 72L located in the corner adjacent portion around the rear lower corner C11 of the window edge in the left wall 30L.

The upper pillar part 74R, the intermediate part 72R, and the beam part 75R of the load transmitting member 70R are continuous in this order so that a rear load F1 applied from the rear to the upper portion of the cabin 30 is transmitted to the side deck 23B of the upper frame 20. Similarly, the upper pillar part 74L, the intermediate part 72L, and the beam part 75L of the load transmitting member 70L are continuous in this order so that the rear load F1 applied from the rear to the upper portion of the cabin 30 is transmitted to the side deck 23B of the upper frame 20.

The load transmitting member 70R has an upper end 71R (an upper end 71R of the upper pillar part 74R) connected to at least one of the right upper beam 43 and an upper end of the right rear pillar 38. The upper end 71R of the load transmitting member 70R is at a specific height position in the upper portion of the cabin 30 to which the rear load F1 is applied from the rear when, for example, the hydraulic excavator 10 is rolled over, or is near the height position relevant to the rear load F1.

The upper pillar part 74R is located in front of the right rear pillar 38 and extends downward along the right rear pillar 38 in adjacent to the right rear pillar 38. The upper pillar part 74 is arranged between the right rear pillar 38 and the rear section S14 of the window edge in a side view. The upper end 71R of the load transmitting member 70R is above the rear upper corner C13 in the embodiment, but may be below the rear upper corner C13. The upper end 71R of the load transmitting member 70R is located at the back of the rear upper corner C13. Here, the second right rear pillar 39 provided in the first embodiment may be excluded or may be provided in the second embodiment.

The intermediate part 72R of the load transmitting member 70R has a portion curving farther away from the wall side edge E2 while advancing diagonally downward. The intermediate part 72R has a portion extending at an outer position than the rear lower corner C11 while curving so as to circumvent the rear lower corner C11 in the side view. The intermediate part 72R has a portion curving so as to cover the outer side of the rear lower corner C11 in the side view.

The beam part 75R of the load transmitting member 70R has a shape linearly extending farther away from the wall side edge E2 and diagonally downward toward the side deck 23B of the upper frame 20. In other words, the beam part 75R has a shape linearly extending frontward and downward from a front end (lower end) of the intermediate part 72R toward the lower portion of the cabin 30. The beam part 75R having the linear shape extending diagonally frontward and downward can prevent a curvature radius in the curving portion of the intermediate part 72R from decreasing to thereby allow the intermediate part 72R to have a gently curving shape.

The beam part 75R has a lower end 73R, i.e., the load transmitting member 70R has the lower end 73R, connected to the lower portion of the cabin 30, specifically connected to the right lower frame 34. The load transmitting member 70R can transmit the rear load F1, which is applied from the rear to the upper portion of the cabin 30, to the side deck 23B via the right lower frame 34.

The left load transmitting member 70L has a structure similar to the above-described structure of the right load transmitting member 70R. More details will be described below. The load transmitting member 70L has an upper end 71L (an upper end 71L of the upper pillar part 74L) connected to at least one of a left upper beam 42 and an upper end of the left rear pillar 37. The upper end 71L of the load transmitting member 70L is at a specific height position in the upper portion of the cabin 30 to which the rear load F1 is applied from the rear when, for example, the hydraulic excavator 10 is rolled over, or is near the height position relevant to the rear load F.

The upper pillar part 74L is located in front of the left rear pillar 37 and extends downward along an upper portion of the left rear pillar 37 in adjacent to the left rear pillar 37. The upper pillar part 74L is arranged between the left rear pillar 37 and the rear section S14 of the window edge in the side view. The upper end 71L of the load transmitting member 70L is above the rear upper corner C13 in the embodiment, but may be below the rear upper corner C13. The upper end 71L of the load transmitting member 70L is located at the back of the rear upper corner C13.

The intermediate part 72L of the load transmitting member 70L has a portion curving farther away from the wall side edge E3 while advancing diagonally downward. The intermediate part 72L has a portion extending at an outer position than the rear lower corner C11 while curving so as to circumvent the rear lower corner C11 in the side view. The intermediate part 72L has a portion curving so as to cover the outer side of the rear lower corner C11 in the side view.

The beam part 75L of the load transmitting member 70L has a shape linearly extending farther away from the wall side edge E3 and diagonally downward toward the side deck 23B of the upper frame 20. In other words, the beam part 75L has a shape linearly extending frontward and downward from a front end (lower end) of the intermediate part 72L toward the lower portion of the cabin 30. The beam part 75L having the linear shape extending diagonally frontward and downward can prevent a curvature radius in the curving portion of the intermediate part 72L from decreasing to thereby allow the intermediate part 72L to have a gently curving shape.

The beam part 75L has a lower end 73L, i.e., the load transmitting member 70L has the lower end 73L, connected to the lower portion of the cabin 30, specifically connected to the left lower frame 33. The load transmitting member 70L can transmit the rear load F1, which is applied from the rear to the upper portion of the cabin 30, to the side deck 23B via the left lower frame 33.

As shown in FIGS. 19 and 20, the lower end 73L of the load transmitting member 70L is connected to the left lower frame 33 at a position in front of the left intermediate pillar 44. In the second embodiment, the left intermediate pillar 44 includes a pillar main body 44A and a pillar lower part 44B. The pillar main body 44A extends downward from the left upper beam 42 to the beam part 75L of the load transmitting member 70L. The pillar lower part 44B extends downward from the beam part 75L of the load transmitting member 70L to the left lower frame 33. The pillar main body 44A has a lower end connected, e.g., welded, to an upper surface of the beam part 75L of the load transmitting member 70L, and the pillar lower part 44B has an upper end connected, e.g., welded, to a lower surface of the beam part 75L of the load transmitting member 70L.

Modifications of the Second Embodiment

Heretofore, the working machine according to the second embodiment of the present disclosure is described, but the present disclosure is not limited to this embodiment and include, for example, the following modifications.

In the second embodiment, either the right load transmitting member 70R or the left load transmitting member 70L may be excluded.

Although the hydraulic excavator according to the second embodiment includes the load transmitting member 60, like the load transmitting member 60 in the first embodiment, as shown in FIGS. 17 and 19, the load transmitting member 60 may be excluded in the second embodiment.

The lower end 73L of the left load transmitting member 70L may be connected to the left lower frame 33 at a position at the back of the left intermediate pillar 44.

At least one of the lower end 73R of the load transmitting member 70R and the lower end 73L of the load transmitting member 70L may be connected to a lower wall 30U (bottom surface of the lower wall 30U).

Regarding the pillar main body 44A and the pillar lower part 44B, the pillar lower part 44B is excludable. In other words, the left intermediate pillar 44 may include only the pillar main body 44A extending from the left upper beam 42 to the beam part 75L of the load transmitting member 70L without the pillar lower part 44B.

The left intermediate pillar 44 may be continuous from the left upper beam 42 to the left lower frame 33 without being separated. In this case, the beam part 75L of the load transmitting member 70L may have a portion extending from the intermediate part 72L to a rear surface of the left intermediate pillar 44, and a portion extending from a front surface of the left intermediate pillar 44 to the left lower frame 33 or the lower wall 30U.

Furthermore, the left intermediate pillar 44 may be continuous from the left upper beam 42 to the left lower frame 33 without being separated, and the beam part 75L of the load transmitting member 70L may be continuous from the intermediate part 72L to the left lower frame 33 or the lower wall 30U. In this case, the beam part 75L of the load transmitting member 70L is deviated to the right or left of the left intermediate pillar 44.

Although the upper pillar part 64 of the load transmitting member 60 is located at the inner position in the wall width direction W1 than the left rear pillar 37 (serving as an exemplary left pillar), i.e., to the right of the left rear pillar 37, and extends downward along the rear pillar 37 in adjacent to the rear pillar 37 in the first embodiment. The present disclosure should not be limited thereto. The upper pillar part 64 of the load transmitting member 60 may be located, for example, in front of the rear pillar 37 and extend downward along the rear pillar 37 in adjacent to the rear pillar 37.

Although the upper pillar part 74R of the load transmitting member 70R is located in front of the right rear pillar 38 (serving as an exemplary rear pillar) and extends downward along the right rear pillar 38 in adjacent to the right rear pillar 38 in the second embodiment, the present disclosure should not be limited thereto. The upper pillar part 74R of the load transmitting member 70R may be located, for example, to the left or right of the right rear pillar 38 and extend downward along the right rear pillar 38 in adjacent to the right rear pillar 38. Although the upper pillar part 74L of the load transmitting member 70L is located in front of the left rear pillar 37 (serving as an exemplary rear pillar) and extends downward along the upper portion of the left rear pillar 37 in adjacent to the left rear pillar 37 in the second embodiment, the present disclosure should not be limited thereto. The upper pillar part 74L of the load transmitting member 70L may be located to the right or left of the left rear pillar 37 and extend downward along the upper portion of the left rear pillar 37 in adjacent to the left rear pillar 37.

According to the present disclosure, provided is a working machine which can suppress a decrease in a stiffness of a cabin by suppressing a crack occurrence in a corner adjacent portion while ensuring a visibility through a window of a wall.

The provided working machine includes: an upper frame supported on a lower traveling body; and a cabin having a box shape defining an inner space therein, and supported by the upper frame. The cabin includes: a plurality of walls enclosing the inner space respectively from front, rear, left, and right thereof; and a load transmitting member disposed along a specific wall which is one of the walls. The specific wall has: a wall side edge serving as a side edge located at an end thereof in a wall width direction which is a width direction of the specific wall and extending in a lengthwise direction; and a window edge defining a window located at an inner position inner than the wall side edge in the wall width direction. The window edge has: a lengthwise section extending in a direction along the wall side edge; a lower section extending in a direction intersecting the direction in which the lengthwise section extends; and a lower corner connecting the lengthwise section and the lower section with each other. The load transmitting member includes: an upper pillar part extending downward from an upper portion of the specific wall along the lengthwise section of the window edge at an outer position outer than the lengthwise section in the wall width direction; an intermediate part extending to circumvent the window from a position above the lower corner and outer in the wall width direction than the lower corner to a position below the lower corner and inner in the wall width direction than the lower corner; and a beam part extending from the intermediate part so as to be farther away from the wall side edge under the window. The upper pillar part, the intermediate part, and the beam part are continuous in this order so that a load applied to an upper portion of the cabin in a direction along the specific wall is transmitted to the upper frame, and at least the intermediate part of the load transmitting member is made of a single member.

In the working machine, the upper pillar part, the intermediate part, and the beam part of the load transmitting member arranged to circumvent the window in the manner described above can ensure the visibility of the operator through the window in a work performed by the working machine. The beam part of the load transmitting member extending from the intermediate part so as to be farther away from the wall side edge can directly or indirectly transmit the load to the upper frame at a position away from the upper portion of the cabin, to which the load is applied, in the wall width direction. The load transmitting member including the beam part serves as a prop for effectively suppressing a deformation of the specific wall attributed to the load. The intermediate part of the load transmitting member extends to circumvent the window from an outer-upper position above the lower corner and outer than the lower corner in the wall width direction to an inner-lower position below the lower corner and inner than the lower corner in the wall width direction, and thus is located in a portion around the lower corner (the corner adjacent portion) of the window edge. At least the intermediate part of the load transmitting member is made of a single member. Specifically, the load transmitting member has no welded part around the corner adjacent portion. In this configuration, the load transmitting member can transmit even a load, which has been applied to the upper portion of the cabin in a direction along the specific wall, to the upper frame sequentially through the upper pillar part, intermediate part, and the beam part while suppressing a crack occurrence in the intermediate part located in the corner adjacent portion. The upper frame has a high strength, and hence can receive the load transmitted via the load transmitting member and support the load transmitting member. The working machine consequently succeeds in ensuring the visibility through the window in performing the work, and further suppressing a decrease in the stiffness of the cabin by suppressing a crack occurrence in the corner adjacent portion of the window edge of the window even when the load is applied to the upper portion of the cabin. Meanwhile, the intermediate part only needs to be made of a single member continuous from the outer-upper position to the inner-lower position. The present disclosure accordingly does not exclude an aspect where an additional component is attached, i.e., welded, to the intermediate part made of a single member as described above.

In the working machine, an entirety of the load transmitting member including the upper pillar part, the intermediate part, and the beam part is preferably made of the single member. In this configuration, the entirety of the load transmitting member including the intermediate part is not formed of a plurality of members sequentially welded to each other, but is made of a single member. As a result, a crack occurrence attributed to the welded part is suppressible over the entirety of the load transmitting member.

In the working machine, the intermediate part preferably has a portion curving farther away from the wall side edge while advancing diagonally downward. In this configuration, the intermediate part having the curving portion smoothly and elastically deforms in a bending direction. Thus, a spring effect is attainable in the intermediate part. In this way, the load transmitting member can effectively absorb a part of energy of the load when the load is applied to the upper portion of the cabin in a direction along the specific wall. As a result, this configuration can more effectively suppress a crack occurrence in the intermediate part located in the corner adjacent portion.

In the working machine, the beam part preferably has a shape linearly extending farther away from the wall side edge and diagonally downward toward the upper frame. In this configuration, the load is linearly and efficiently transmittable to the upper frame via the linearly extending beam part.

In the working machine, the load transmitting member may further include a lower pillar part extending downward from the beam part. In this configuration, the load transmitting member further including the lower pillar part can have a notably increased stiffness, resulting in achieving a remarkably increased stiffness of the cabin.

In the working machine, the cabin preferably further includes a rear pillar extending downward from an upper end of the specific wall to a lower end of the specific wall along the wall side edge. The upper pillar part of the load transmitting member preferably extends downward along the rear pillar in adjacent to the rear pillar. The load transmitting member disposed along the specific wall serves as another member independent of the rear pillar in this configuration. The load transmitting member and the rear pillar can effectively suppress a deformation of the specific wall even when the load is applied to the upper portion of the cabin in the direction along the specific wall. This can consequently further increase the stiffness of the cabin against the load.

In the working machine, it is preferable that the walls include a rear wall located at the back of the inner space, the specific wall serves as the rear wall, and the window serves as a rear window, and the load transmitting member is disposed along the rear wall. This configuration makes it possible to suppress a decrease in the stiffness of the cabin by suppressing a crack occurrence in the intermediate part located in the corner adjacent portion even when the lateral load is applied, in a direction along the rear wall, to the upper portion of the cabin on the left or right side thereof where the upper pillar part of the load transmitting member is located. An evacuation route is predetermined for allowing the operator to evacuate from the cabin through the route other than the door on the lateral side of the cabin when the working machine is rolled over. The evacuation route is set to, for example, a route through the rear window of the cabin. This arrangement of the upper pillar part, the intermediate part, and the beam part of the load transmitting member to circumvent the rear window can ensure the evacuation route through the rear window even when the working machine is rolled over.

The cabin preferably further includes a rear pillar extending downward from an upper end of the rear wall to a lower end of the rear wall along the wall side edge. The upper pillar part of the load transmitting member is preferably located at an inner position inner than the rear pillar in the wall width direction, and extends downward along the rear pillar in adjacent to the rear pillar. The load transmitting member disposed along the rear wall serves as another member independent of the rear pillar in this configuration. Accordingly, the load transmitting member and the rear pillar can effectively suppress a deformation of the specific wall even when the lateral load is applied to the upper portion of the cabin in a direction along the rear wall. This can further increase the stiffness of the cabin against the lateral load. Moreover, the upper pillar part of the load transmitting member extends downward along the rear pillar in adjacent to the rear pillar at the inner position than the rear pillar in the wall width direction. In this respect, the lateral load is effectively transmittable to the upper pillar part of the load transmitting member via the rear pillar.

The upper frame preferably includes a side deck supporting the cabin. The side deck preferably has a deck main body and a plurality of mounts supported by the deck main body. The mounts preferably support the cabin so as to suppress a vibration of the cabin, and the load transmitting member preferably has a lower end connected to a lower portion of the cabin at such a position as to overlap, in a plan view, a specific mount that is a predetermined mount among the mounts. In this configuration, the lower end of the load transmitting member is located just above the specific mount, and therefore, the load transmitting member can effectively transmit the lateral load, which is applied to the upper portion of the cabin, to the specific mount on the upper frame.

In the working machine, it is preferable that the walls include a left wall located to the left of the inner space, and a right wall located to the right of the inner space, the specific wall serves as one of the left wall and the right wall, the window serves as a side window, the wall side edge serves as a rear edge extending in the lengthwise direction at a rear end of the specific wall, and that the load transmitting member is disposed along the one of the left wall and the right wall. This configuration makes it possible to suppress a decrease in the stiffness of the cabin by suppressing a crack occurrence in the intermediate part located in the corner adjacent portion even when a rear load is applied to the upper portion of the cabin.

The cabin preferably further includes a rear pillar extending downward from an upper end of the specific wall to a lower end of the specific wall along the wall side edge. Preferably, the upper pillar part of the load transmitting member is located in front of the rear pillar, and extends downward along the rear pillar in adjacent to the rear pillar. In this configuration, the load transmitting member disposed along one of the left wall and the right wall serves as another member independent of the rear pillar. Accordingly, the load transmitting member and the rear pillar can effectively suppress a deformation of the one wall (specific wall) even when the rear load is applied to the upper portion of the cabin in a direction along the one wall. This can further increase the stiffness of the cabin against the rear load. Additionally, the upper pillar part of the load transmitting member extends downward in front of the rear pillar along the rear pillar in adjacent to the rear pillar. In this configuration, the rear load is efficiently transmittable to the upper pillar part of the load transmitting member via the rear pillar.

The cabin preferably further includes a front pillar located in front of the side window and extending downward from an upper end of the specific wall to a lower end of the specific wall, and an intermediate pillar located between the front pillar and the rear pillar and extending downward from the upper end of the specific wall. The load transmitting member preferably has a lower end connected to a lower portion of the cabin at a position in front of the intermediate pillar. This configuration is more advantageous in directly or indirectly transmit the rear load, which has been applied to the upper portion of the cabin, to the upper frame at a position frontward and away from the upper portion of the cabin than a configuration where a load transmitting member has a lower end connected to a lower portion of a cabin at a position at the back of a lower end of an intermediate pillar. This can consequently further increase the stiffness of the cabin against the rear load.

This application is based on Japanese Patent application No. 2020-165108 filed on Sep. 30, 2020 and Japanese Patent Application No. 2021-037209 filed on Mar. 9, 2021 in Japan Patent Office, the contents of which are hereby incorporated by reference.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A working machine, comprising:
an upper frame supported on a lower traveling body; and
a cabin having a box shape defining an inner space therein, and supported by the upper frame, wherein
the cabin includes:
a plurality of walls enclosing the inner space respectively from front, rear, left, and right thereof;
a load transmitting member disposed along a specific wall which is one of the walls, and
a rear pillar extending downward from an upper end of the specific wall to a lower end of the specific wall, the specific wall has:
- a wall side edge serving as a side edge located at an end thereof in a wall width direction which is a width direction of the specific wall and extending in a lengthwise direction; and
- a window edge in the specific wall, the window edge defining a window located at a more inward position than the wall side edge in the wall width direction, the window edge has:
- a lengthwise section extending in a direction along the wall side edge;
- a lower section extending in a direction intersecting the direction in which the lengthwise section extends; and
- a lower corner connecting the lengthwise section and the lower section with each other, and the rear pillar extends downward from the upper end of the specific wall to the lower end of the specific wall along the wall side edge, the load transmitting member includes:
- an upper pillar part extending downward from an upper portion of the specific wall along the lengthwise section of the window edge at a more outward position than the lengthwise section in the wall width direction and along the rear pillar adjacent to the rear pillar;
- an intermediate part extending to circumvent the window from a position above the lower corner and more outward than the lower corner in the wall width direction to a position spaced at a distance below the lower corner and more inward than the lower corner in the wall width direction; and
- a beam part extending from the intermediate part so as to be farther away from the wall side edge under the window, and the upper pillar part, the intermediate part, and the beam part are continuous in this order so that a load applied to an upper portion of the cabin in a direction along the specific wall is transmitted to the upper frame, and at least the intermediate part of the load transmitting member is made of a single member.

2. The working machine according to claim 1, wherein an entirety of the load transmitting member including the upper pillar part, the intermediate part, and the beam part is made of the single member.

3. The working machine according to claim 1, wherein the intermediate part has a portion curving farther away from the wall side edge while advancing diagonally downward.

4. The working machine according to claim 1, wherein the beam part has a shape linearly extending, toward the upper frame, farther away from the wall side edge and diagonally downward.

5. The working machine according to claim 1, wherein the load transmitting member further includes a lower pillar part extending downward from the beam part.

6. The working machine according to claim 1, wherein the walls include a rear wall located at the back of the inner space,
the specific wall serves as the rear wall, and the window serves as a rear window,
the load transmitting member is disposed along the rear wall, and
the upper pillar part of the load transmitting member is located at a more inward position than the rear pillar in the wall width direction.

7. The working machine according to claim 6, wherein the upper frame includes a side deck supporting the cabin,
the side deck has a deck main body and a plurality of mounts supported by the deck main body,
the mounts support the cabin so as to suppress a vibration of the cabin, and
the load transmitting member has a lower end connected to a lower portion of the cabin at such a position as to overlap a specific mount in a plan view, the specific mount being a predetermined mount among the mounts.

8. The working machine according to claim 1, wherein the walls include a left wall located to the left of the inner space, and a right wall located to the right of the inner space,
the specific wall serves as one of the left wall and the right wall, the window serves as a side window, and the wall side edge serves as a rear edge extending in the lengthwise direction at a rear end of the specific wall,
the load transmitting member is disposed along the one of the left wall and the right wall, and
the upper pillar part of the load transmitting member is located in front of the rear pillar.

9. The working machine according to claim 8, wherein the cabin further includes a front pillar located in front of the side window and extending downward from an upper end of the specific wall to a lower end of the specific wall, and an intermediate pillar located between the front pillar and the rear pillar and extending downward from the upper end of the specific wall, and
the load transmitting member has a lower end connected to a lower portion of the cabin at a position in front of the intermediate pillar.

* * * * *